US006965440B1

(12) United States Patent
Nakagiri et al.

(10) Patent No.: US 6,965,440 B1
(45) Date of Patent: Nov. 15, 2005

(54) PRINT CONTROL METHOD AND APPARATUS

(75) Inventors: Koji Nakagiri, Kanagawa (JP); Satoshi Nishikawa, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1035 days.

(21) Appl. No.: 09/703,692

(22) Filed: Nov. 2, 2000

(30) Foreign Application Priority Data

Nov. 2, 1999 (JP) .................................. 11-313119

(51) Int. Cl.[7] ........................................... G06K 15/00
(52) U.S. Cl. .................... 358/1.12; 358/1.18; 715/500; 715/517
(58) Field of Search .............................. 358/1.12, 1.18, 358/1.5, 1.15, 1.6, 1.9; 915/517, 520, 539; 700/517, 518; 364/519; 345/439; 355/127; 399/81, 82, 634; 715/500

(56) References Cited

U.S. PATENT DOCUMENTS 4,928,252 A * 5/1990 Gabbe et al. ................. 358/1.2
5,963,216 A * 10/1999 Chiarabini et al. ......... 345/660

* cited by examiner

*Primary Examiner*—King Y. Poon
(74) *Attorney, Agent, or Firm*—Fitzpatrick, Cella, Harper & Scinto

(57) ABSTRACT

When "store" of intermediate data is designated in a print process, a spooler stores intermediate data and an output job setup file in a spool file. When the stored job is selected, a previewer displays a list of jobs, and displays a print preview image. In this case, if "Same side on" is designated, pages of successive jobs are laid out without any gaps. If "new sheet" is designated, pages of the trailing job are laid out on a new sheet. If "Other side on" is designated, pages of the trailing job are laid out on a new surface.

18 Claims, 30 Drawing Sheets

FIG. 11

| | |
|---|---|
| TOTAL NUMBER OF PHYSICAL PAGES | ~1101 |
| TOTAL NUMBER OF LOGICAL PAGES | ~1102 |
| NUMBER OF COPIES | ~1103 |
| COPY SET PRINT | ~1104 |
| FINISHING INFORMATION | ~1105 |
| ADDITIONAL PRINT INFORMATION | ~1106 |

FIG. 28

EDIT JOB SETTINGS

NAME COMBINED DOCUMENTS | COMBINED JOB 3 |

TOTAL PAGES:2

| JOB 1 PAGE 1 | | JOB 2 PAGE 1 | JOB 2 PAGE 3 |
| | | JOB 2 PAGE 2 | |

DELETE

PRINT PREVIEW

JOB LIST | PRINT SETTINGS

COPIES: 1 [1-255]

PRINT STYLE: 2-SIDED PRINTING ▼
☐ STAPLE
☐ SADDLE STITCH

☑ LAYOUT CONSISTENCY
PAGE LAYOUT — 2 PAGE PER SHEET ▼
PAGE ORDER — BOTTOM TO TOP ▼

☐ PRINT NEXT DOCUMENT FROM ▼
2801
2802
DETAILS....

RESTORE DEFAULTS | OK | CANCEL | HELP

FIG. 29

EDIT JOB SETTINGS

NAME COMBINED DOCUMENTS | COMBINED JOB 3

TOTAL PAGES:2

| JOB 1 PAGE 1 | JOB 2 PAGE 1 | JOB 2 PAGE 2 | JOB 2 PAGE 3 |

1  2

DELETE

PRINT PREVIEW

JOB LIST | PRINT SETTINGS

COPIES: 1 [1-255]

PRINT STYLE: 2-SIDED PRINTING
☐ STAPLE
☐ SADDLE STITCH

☑ LAYOUT CONSISTENCY
PAGE LAYOUT — 2 PAGE PER SHEET
PAGE ORDER — BOTTOM TO TOP

☑ PRINT NEXT DOCUMENT FROM  OTHER SIDE ON
2801

DETAILS....

RESTORE DEFAULTS | OK | CANCEL | HELP

FIG. 30

EDIT JOB SETTINGS

NAME COMBINED DOCUMENTS [COMBINED JOB 3]

TOTAL PAGES:2

| JOB 1 | JOB 2 |
| PAGE 1 | PAGE 1 |

| JOB 2 | JOB 2 |
| PAGE 2 | PAGE 2 |

DELETE

PRINT PREVIEW

☑ LAYOUT CONSISTENCY
   PAGE LAYOUT       [2 PAGE PER SHEET ▶]
   PAGE ORDER        [↓ TOP TO BOTTOM ▶]

☑ PRINT NEXT DOCUMENT FROM [SAME SIDE ON ▶]

DETAILS....

JOB LIST | PRINT SETTINGS

COPIES:      [1] ◀▶   [1-255]

PRINT STYLE: [2-SIDED PRINTING ▶]
             ☐ STAPLE
             ☐ SADDLE STITCH

2801

RESTORE DEFAULTS        OK    CANCEL    HELP

PRINT CONTROL METHOD AND APPARATUS

FIELD OF THE INVENTION

The present invention relates to a print control method, apparatus, and medium and, more particularly, to a print control method, apparatus, and medium storing a computer program in a system including an information processing apparatus such as a personal computer or the like, and a printer.

BACKGROUND OF THE INVENTION

Conventionally, print control apparatuses and the like often have a function of temporarily spooling and holding a print job in a given format, e.g., an intermediate code format before being converted into a command to a printer before an image is actually printed on a paper sheet upon printing data such as text data, image data, or the like edited by an application program for editing text or image data. Some of such apparatuses can combine a plurality of held print jobs into a single job.

Also, a print preview function of displaying held print jobs on a window in a layout to be printed to present them to the user is known.

However, even an apparatus with the function of combining print jobs cannot designate the way they are combined. For example, when print jobs to be combined have a layout in which one page is printed on one surface of a sheet, they need only be simply combined and printed. On the other hand, some layouts such as two-sided print and N-up print (that prints N pages laid out on a single surface of a sheet) cannot uniquely determine how to combine the jobs. In this manner, even when the way the jobs are combined cannot be uniquely determined, jobs are combined by a given method.

SUMMARY OF THE INVENTION

The present invention has been made in consideration of the aforementioned prior art, and has its object to provide a print control method and apparatus, which allow the user to select a combine method of jobs upon combining print jobs.

In order to achieve the above object, the present invention has the following arrangement. That is, a print control method of combining stored print jobs, comprises:

the determination step of determining a combine method of designated pages; and the page layout step of successively laying out a last page of a leading job and a first page of a trailing job when "Same side on" is designated as the combine method, laying out the first page of the trailing job on a surface next to a surface on which the last page of the leading job is laid out when "Other side on" is designated as the combine method, and laying out the first page of the trailing job on a sheet next to a sheet on which the last page of the leading job is laid out when "new sheet" is designated as the combine method.

More preferably, the method further comprises the step of displaying an input window used to designate the combine method.

More preferably, when a one-sided print process is designated, the surface next to the surface on which the last page of the leading job is laid out is a sheet next to a sheet on which the last page of the leading job is laid out.

More preferably, the method further comprises the step of making display means display a preview image of the job in a layout corresponding to the designated combine method.

More preferably, the method further comprises the step of making a print engine print the job in a layout corresponding to the designated combine method.

More preferably, the method further comprises a storage for storing print data in units of print jobs.

Alternatively, according to another aspect of the present invention, there is provided an apparatus for implementing the method.

Alternatively, according to still another aspect of the present invention, there is provided a storage medium which stores a computer program for making a computer implement the method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows an example of a data format to be passed when the spool file manager 304 issues a print request of a physical page to the despooler 305;

FIG. 28 shows an example of preview display when "two-sided", "2-up", and "new sheet" are designated;

FIG. 29 shows an example of preview display when "two-sided", "2-up", and "Other side on" are designated; and FIG. 30 shows an example of preview display when "two-sided", "2-up", and "Same side on" are designated.

DETAILED DESCRIPTION OF THE PREFERRED EMBODIMENTS

Preferred embodiments of the present invention will be described hereinafter.

<Arrangement of Printer Control System>

Figure 1:
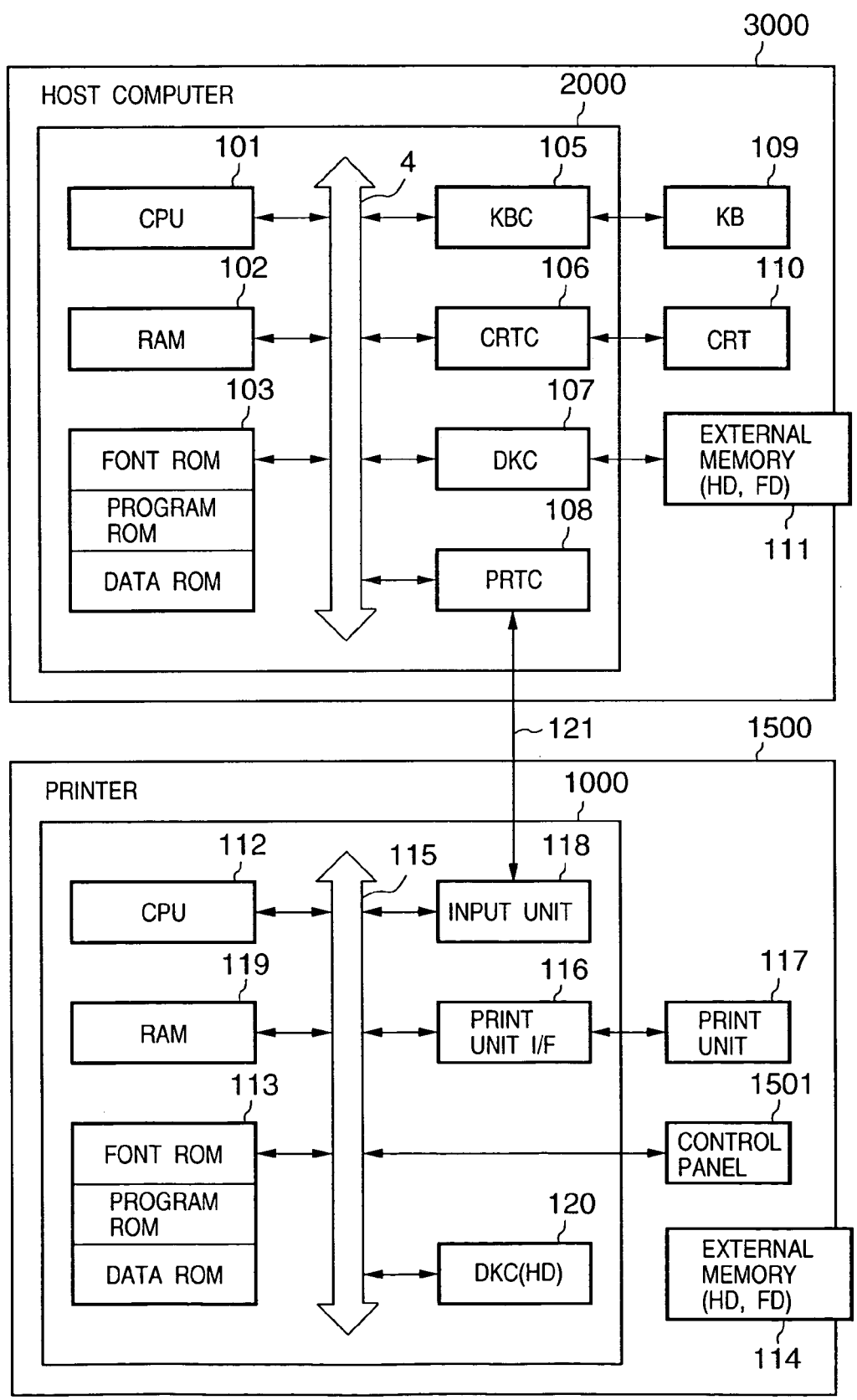
FIG. 1 is a block diagram for explaining the arrangement of a print control apparatus according to an embodiment of the present invention.

FIG. 1 is a block diagram for explaining the arrangement of a printer control system according to an embodiment of the present invention. Note that the present invention can be applied to any of a standalone device, a system built by a plurality of devices, and a system in which devices are connected via a network such as a LAN, WAN, or the like to execute processes, as long as the functions of the present invention are implemented.

Referring to FIG. 1, a host computer 3000 comprises a CPU 101 that processes a document including figures, images, text, tables (including a spreadsheet or the like), and the like on the basis of a document processing program stored in a program ROM in a ROM 3 or an external memory 111, and systematically controls devices connected to a system bus 104. The program ROM in the ROM 103 or external memory 111 stores an operating system program (to be referred to as an OS hereinafter) or the like as a control program of the CPU 101, a font ROM in the ROM 103 or the external memory 111 stores font data or the like used in the document process, and a data ROM in the ROM 103 or the external memory 111 stores various data used upon executing the document process. A RAM 102 serves as a main memory, work area, and the like of the CPU 101.

A keyboard controller (KBC) 105 controls key input from a keyboard 109 and a pointing device (not shown). A CRT controller (CRTC) 106 controls display of a CRT display (CRT) 110. Reference numeral 107 denotes a disk controller (DKC) which controls access to the external memory 111 such as a hard disk (HD), floppy disk (FD), and the like, which store a boot program, various application programs, font data, user files, edit files, a printer control command generation program (to be referred to as a printer driver hereinafter), and the like. A printer controller (PRTC) 108 is connected to a printer 1500 via a two-way interface (interface) 121 to implement a communication control process with the printer 1500.

Note that the CPU 101 rasterizes outline font data on a display information RAM assured on, e.g., the RAM 102 to realize WYSIWYG on the CRT 110. The CPU 101 opens various registered windows on the basis of commands instructed by a mouse cursor (not shown) or the like on the CRT 110, and executes various data processes. The user can set a print processing method for the printer driver including the printer setup and print mode selection by opening a window that pertains to the print setups upon executing a print process.

The printer 1500 is controlled by a CPU 112. The printer CPU 112 outputs an image signal as output information to a print unit (printer engine) 117, which is connected to a system bus 115, on the basis of a control program or the like stored in a program ROM in a ROM 113, or a control program or the like stored in an external memory 114. The program ROM in the ROM 113 stores the control program and the like of the CPU 112. A font ROM in the ROM 113 stores font data or the like used upon generating the output information, and a data ROM in the ROM 113 stores information and the like used on the host computer when the printer has no external memory 114 such as a hard disk or the like.

The CPU 112 can communicate with the host computer via an input unit 118, and can inform the host computer 3000 of information or the like in the printer. A RAM 119 serves as a main memory, work area, and the like of the CPU 112, and its memory size can be expanded by an option RAM connected to an expansion port (not shown). Note that the RAM 119 is used as an output information rasterizing area, environment data storage area, NVRAM, and the like. Access to the aforementioned external memory 114 such as a hard disk (HD), IC card, or the like is controlled by a memory controller (DKC) 120. The external memory 114 is connected as an option, and stores font data, an emulation program, form data, and the like. Reference numeral 1501 denotes a control panel on which operation switches, LED indicators, and the like are arranged.

The number of external memories 114 is not limited to one, but a plurality of external memories 114 may be connected. That is, a plurality of option font cards in addition to built-in fonts and external memories that store programs for interpreting printer control languages of different language systems may be connected. Furthermore, an NVRAM (not shown) may be connected, and may store printer mode setup information from the control panel 1501.

Figure 2:
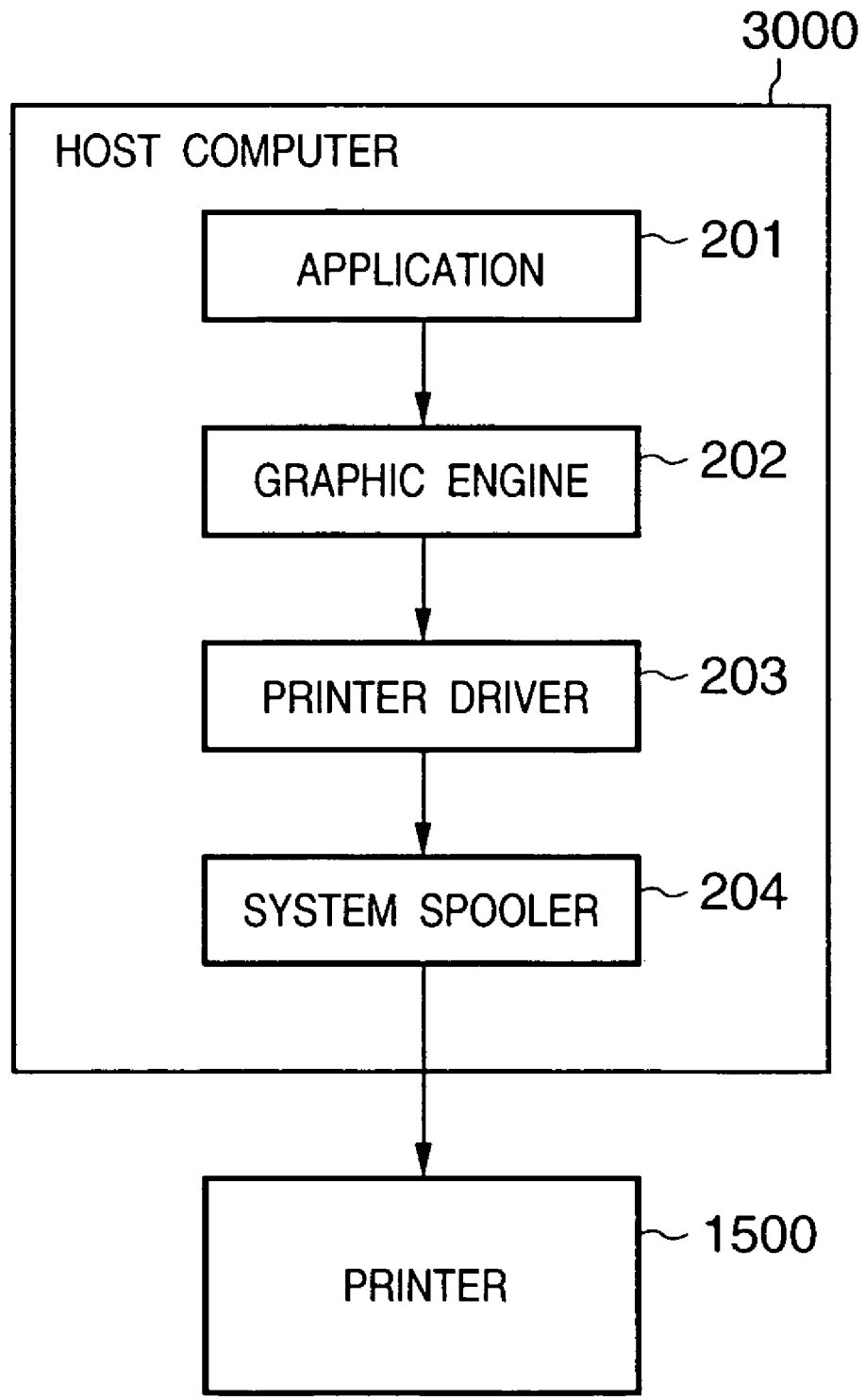
FIG. 2 is a block diagram showing the arrangement of a typical print system built by a host computer to which a printer is connected.

FIG. 2 shows the configuration of typical print processing software in the host computer to which a printing apparatus such as a printer or the like is connected directly or via a network. An application program (to be simply referred to as an application hereinafter) 201, graphic engine 202, printer driver 203, and system spooler 204 are program modules which are stored as files in the external memory 111, and are loaded onto the RAM 102 by the OS or a module that uses the corresponding module upon execution. The application 201 and printer driver 203 can be added to the files stored in the HD using the FD in the external memory 111 or a CD-ROM (not shown), or via a network (not shown). The application 201 stored in the external memory 111 is loaded onto the RAM 102 upon execution. When the application 201 executes a print process with respect to the printer 1500, it outputs (renders) data using the graphic engine 202 which is similarly loaded onto the RAM 102 upon execution.

The graphic engine 202 loads a printer driver 203 which is prepared for each printing apparatus from the external memory 111 onto the RAM 102, and sets the output from the application 201 in the printer driver 203. The graphic engine 202 then converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command, e.g., PDL (Page Description Language) that the printer can recognize. The converted printer control command is output as print data to the printer 1500 via the interface 121 by the system spooler 204 which is loaded onto the RAM 102 by the OS.

Figure 3:
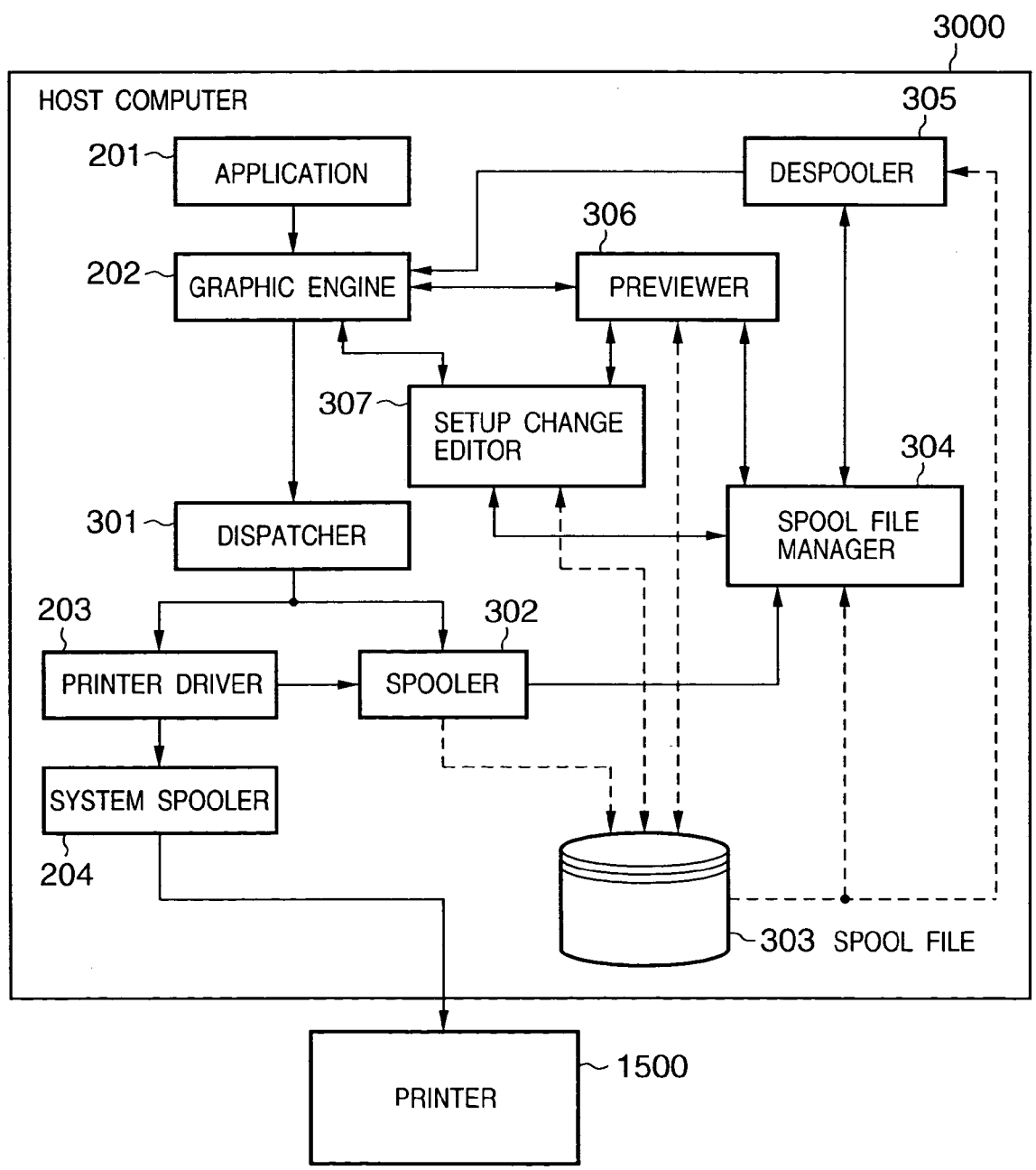
FIG. 3 is a block diagram showing the arrangement of a print system which temporarily spools intermediate codes before a print command from an application is converted into a print control command.

The print system of this embodiment also has an arrangement for temporarily spooling print data from the application as intermediate codes, as shown in FIG. 3, in addition to the print system constructed by the printer and host computer shown in FIG. 2.

<Print-Related Software Modules in Embodiment>

FIG. 3 shows the expanded system of FIG. 2. This system temporarily generates a spool file 303 consisting of intermediate codes upon sending a print command from the graphic engine 202 to the printer driver 203. In the system shown in FIG. 2, the application 201 is released from the print process when the printer driver 203 has converted all print commands from the graphic engine 202 into printer control commands. By contrast, in the system shown in FIG. 3, a spooler 302 converts all print commands into intermediate code data, and the application 201 is released from the print process when it outputs print commands to the spool file 303. Normally, the latter system can shorten the processing time. In the system shown in FIG. 3, data as the contents of the spool file 303 can be processed. In this way, functions such as enlargement/reduction, reduced-scale print of a plurality of pages on one page, and the like that the application does not have can be implemented for print data from the application.

For these purposes, the system of this embodiment is attained by expanding the system shown in FIG. 2 to spool data as intermediate codes, as shown in FIG. 3. In order to process print data, setups are normally made from a window provided by the printer driver 203, which saves the setup contents on the RAM 102 or external memory 111.

The arrangement in FIG. 3 will be explained in detail below. As shown in FIG. 3, in this expanded processing system, a dispatcher 301 receives a DDI function as a print command from the graphic engine 202. When the print command (DDI function) that the dispatcher 301 receives from the graphic engine 202 is based on a print command (GDI function) issued from the application 201 to the graphic engine 202, the dispatcher 301 loads the spooler 302 stored in the external memory 111 onto the RAM 102, and sends the print command (DDI function) to the spooler 302 in place of the printer driver 203.

The spooler 302 interprets the received print command, converts it into intermediate codes in units of pages, and outputs the codes to the spool file 303. The spool file of intermediate codes stored in units of pages is called a page description file (PDF). Since one PDF corresponds to one print job, the spooled PDF is also often called a job or print job simply. The spooler 302 acquires processing setups (N-up, two-side, staple, color/monochrome designation, or the like) associated with print data set in the printer driver 203 from the printer driver 203, and saves them as a setup file for each job in the spool file 303. The setup file stored in units of jobs is called a job setup file (also called an SDF as an abbreviation for a spool description file). The job setup file will be described later. Note that the spool file 303 is generated as a file on the external memory 111, but may be generated on the RAM 102. Furthermore, the spooler 302 loads a spool file manager 304 stored in the external memory 111 onto the RAM 102, and informs the spool file manager 304 of the generation state of the spool file 303. After that, the spool file manager 304 checks if a print process can be done in accordance with the contents of the processing setups associated with print data, which are saved in the spool file 303.

If the spool file manager 304 determines that the print process can be done using the graphic engine 202, it loads a despooler 305 stored in the external memory 111 onto the RAM 102, and instructs the despooler 305 to execute the print process of the page description files of intermediate codes described in the spool file 303.

The despooler 305 processes the page description files of intermediate codes included in the spool file 303 in accordance with the job setup file which is included in the spool file 303 and includes processing setup information, re-generates a GDI function, and outputs it via the graphic engine 202 once again.

When the print command (DDI function) that the dispatcher 301 receives from the graphic engine 202 is based on a print command (GDI function) issued from the despooler 305 to the graphic engine 202, the dispatcher 301 sends the print command to the printer driver 203 in place of the spooler 302.

The printer driver 203 generates a printer control command described in a page description language or the like on the basis of the DDI function acquired from the graphic engine 202, and outputs the generated command to the printer 1500 via the system spooler 204.

Furthermore, FIG. 3 shows an example which includes a previewer 306 and setup change editor 307 in addition to the expanded system described so far, and allows a print preview process, print setup change process, and combination process of a plurality of jobs.

Figure 9:
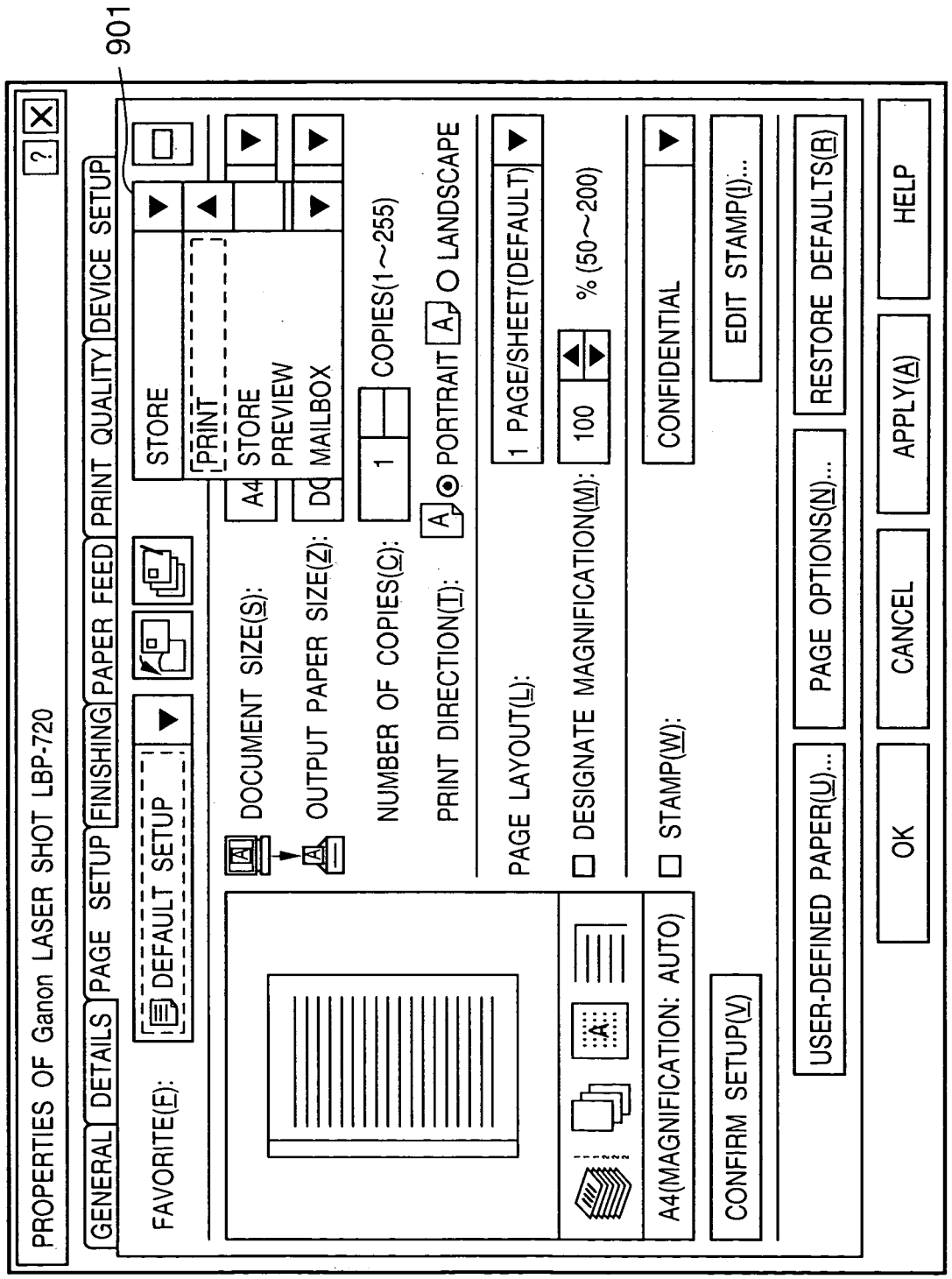
FIG. 9 shows an example of a print spool setup window.

In order to implement the print preview process, print setup change process, and combination process of a plurality of jobs, the user must designate "store" on a pull-down menu 901 as a means for "designating an output destination" in a property window of the printer driver shown in FIG. 9. When the user wants to only preview, he or she can select "preview" as designation of the output destination.

Figure 16:
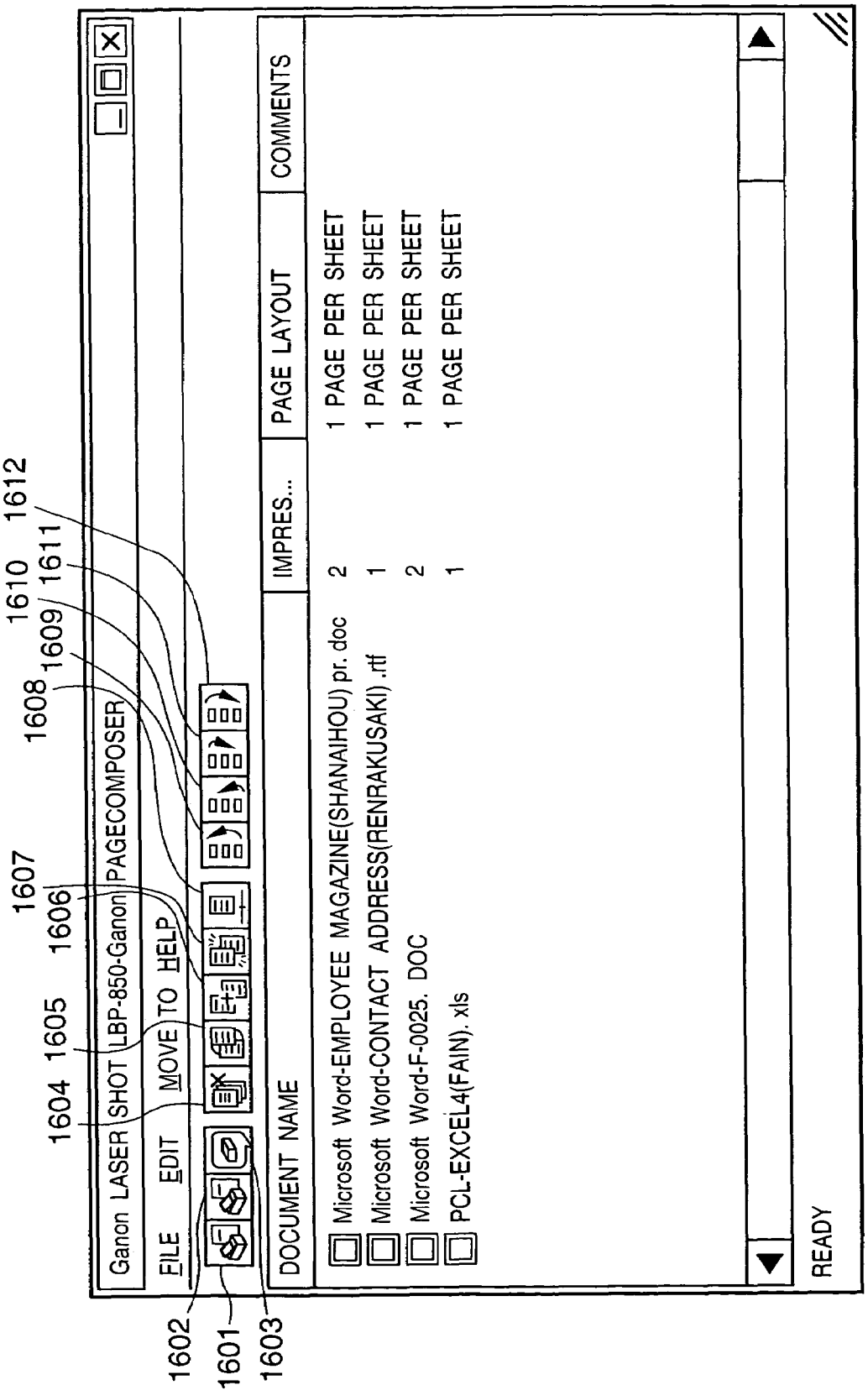
FIG. 16 shows an example of a window that displays a list of print jobs spooled in the spool file manager 304.

The contents set on the property window of the printer driver in this way are stored in a structure (for example, a structure called DEVMODE in Windows OS available from Microsoft Corp.) provided by the OS as a setup file. That structure includes, e.g., store designation. Store designation is a setup for storing a print command and processing setup in the spool file 303. When the spool file manager 304 reads the processing setup via the printer driver 203 and that setup includes store designation, the spool file 303 generates and stores a page description file and job setup file, as described above. Then, the window of the spool file manager 304 pops up, as shown in FIG. 16, and displays a list of jobs spooled by the spool file 303. FIG. 16 shows an example wherein four jobs are spooled, and operations for each job can be selected from a menu bar or by pressing menu icons below the menu bar. Operations that can be selected from the menu bar are the same as those of the menu icons. The following types of operations are available. Note that each operation is done while selecting a desired job. That is, there are 12 operations:

(1) "print": executes a given job while selecting that job. That is, this operation prints the designated spool file.
(2) "save & print": executes a print process while saving a job of the selected intermediate codes.
(3) "preview": displays output preview in consideration of the print setups.
(4) "delete": deletes the selected job.
(5) "copy": generates a copy of the selected job.
(6) "combine": combines a plurality of jobs into one job.
(7) "divide": divides the combined job into a plurality of original jobs.
(8) "job edit" changes the print setups (layout setup, finishing setup, and the like) of an independent or combined job.
(9) "move to top": moves the print order of a given job to the top of a job list.
(10) "move up by one": advances the print order of a given job by one.
(11) "move down by one": delays the print order of a given job by one.
(12) "move to last": moves the print order of a given job to the last of a job list.

When "preview" of an independent or combined job is designated on the window (FIG. 16) of the spool file manager, the previewer 306 stored in the external memory 111 is loaded onto the RAM 102, and is instructed to execute a preview process of a job of the intermediate codes described in the spool file 303.

(Previewer)

The previewer 306 sequentially reads out page description files (PDF) of intermediate codes included in the spool file 303, processes them in accordance with the contents of processing setup information included in the job setup file (SDF) stored in the spool file 303, and outputs a GDI function to the graphic engine 202. The graphic engine 202 can output a preview window onto the screen by outputting rendering data on its own client area.

The graphic engine 202 can appropriately render in correspondence with the designated output destination. The previewer 306 implements preview by the method of processing intermediate codes included in the spool file 303 in accordance with the contents of the processing setups included in the spool file 303 and outputting them using the graphic engine as in the despooler 305. In this way, since the processing setups set in the printer driver are stored as a job setup file in the spool file 303 and data of the page description file are processed and output based on the job setup file, a print preview approximate to an actual printout can be provided to the user in correspondence with the way actual rendering data is printed, and designated processes (e.g., an N-up process (for laying out and printing N logical pages on one physical page), a two-sided print process, a bookbinding print process, a stamp process, and the like). Since the preview function of conventional application software such as document creation software renders based on page setups in that application, the print setups in the printer driver are not reflected in preview, and the user cannot recognize a preview of an image to be actually printed out.

One logical page is one page in data created by the application, and one physical page corresponds to one surface of one sheet (e.g., one paper sheet). More specifically, when the N-up process is designated, images for N pages created by the application are laid out and printed on a single sheet in a reduced scale.

Figure 17:
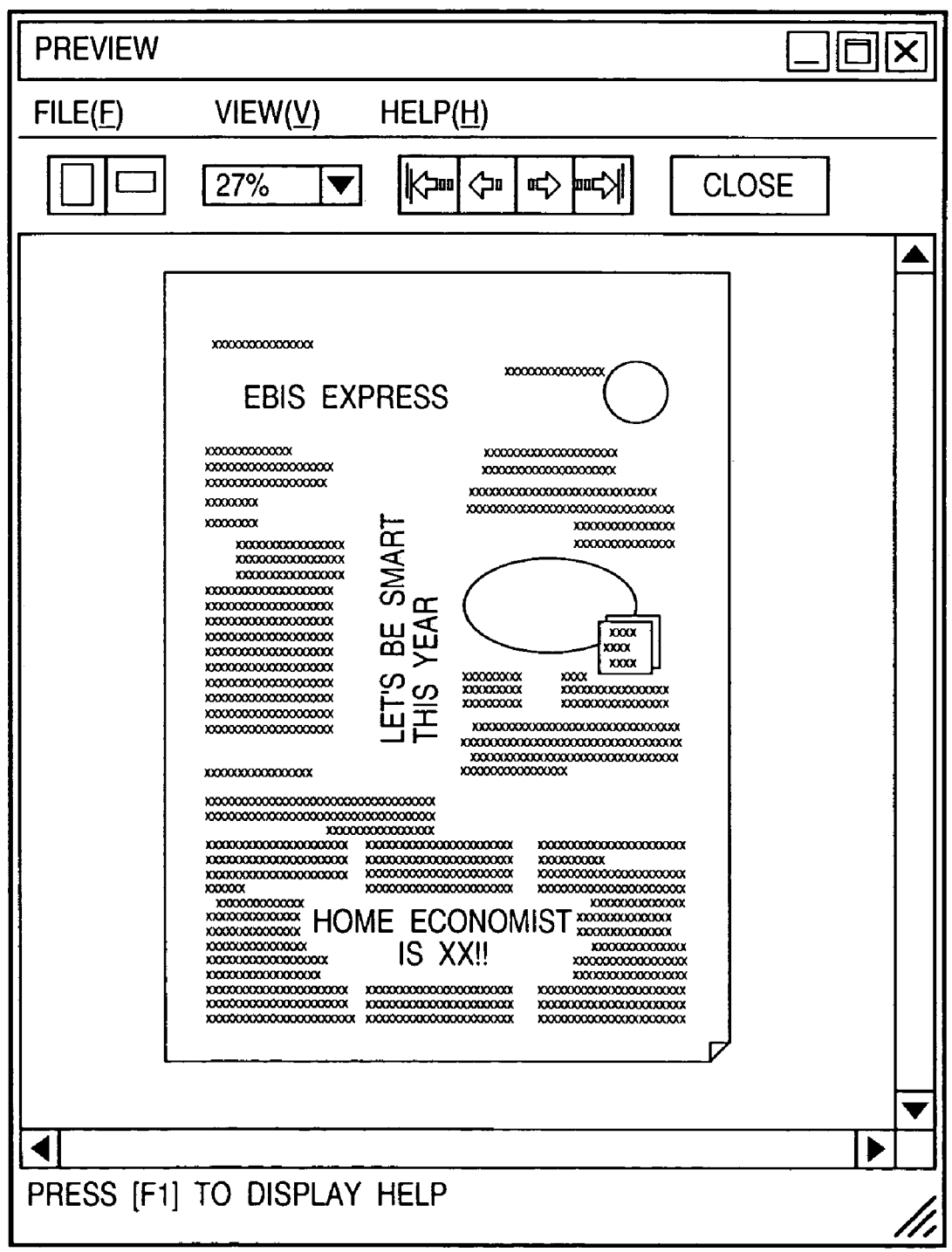
FIG. 17 shows an example of a window of a previewer 306.

By executing the preview process in this fashion, a large preview image of an image processed in accordance with the print processing setups saved in the spool file 303 is displayed on the screen by the previewer 306, as shown in FIG. 17. After that, the previewer 306 is closed in response to the user's non-display instruction (designation of "close")), and the control shifts to the window (FIG. 16) of the spool file manager.

When the user wants to print the contents displayed by the previewer 306, he or she issues a print request by selecting "print" or "save & print" on the spool file manager 304. In response to the print request, the despooler 305 generates a GDI function by processing each page description file based on the job setup file, and passes it to the graphic engine 202. Then, a print command is sent to the printer driver 203 via the dispatcher 301, thus executing the print process.

(Setup Change Editor)

A setup change process using the setup change editor 307 will be explained below.

The setup change process can be done for a "store"-designated job in FIG. 9 as in the preview process. The window of the spool file manager 304 pops up in the same sequence as in the preview process, and displays a list of spooled jobs. A setup change instruction is issued by designating "job edit" for the selected spool file on the window (FIG. 16) of the spool file manager. When the setup change instruction is issued, the setup change editor 307 stored in the external memory 111 is loaded onto the RAM and is instructed to display current or default processing setups. Then, a job setup window shown in FIG. 18 is displayed.

Figure 18:
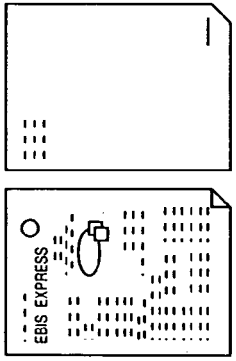
FIG. 18 shows an example of a window of the setup change editor 307.

The setup change editor 307 acquires the job setup file of the "job edit"-designated job, and default values of the job setup window in FIG. 18 are changed on the basis of setup items designated in that job setup file. In the example shown in FIG. 18, the job setup file of the "job edit"-designated file is designated with the number of copies: 1, print method: one-sided, staple: none, layout: 1 page/sheet, and the like.

This setup change editor 307 can also make a small preview output on the window shown in FIG. 18 by processing each page description file of intermediate codes stored in the spool file 303 in accordance with the contents of the processing setups included in the job setup file stored in the spool file 303, and outputting them onto its own client area using the graphic engine.

Also, this editor can change and correct the contents of the processing setups included in the job setup file stored in the spool file 303. In this case, the user interface on the setup change editor 307 may have items that the printer driver 203 can set, or the user interface of the printer driver 203 itself may be called. As shown in FIG. 18, the number of copies, the print method (one-side, two-side, bookbinding print), staple (saddle finisher, or the like), page layout, layout order, and the like can be designated. Upon pressing "detailed setups", most of items that the printer driver can designate can be re-set. However, changes of setups that pertain to print quality such as the resolution, graphic mode, and the like are not permitted.

When the changed items are confirmed in accordance with a confirmation request on the setup change editor 307, the control shifts to the spool file manager 304. The confirmed print setups that have been changed are saved. In this case, the setups are not saved in an original job setup file, but a new job output setup file used in the job edit process or the like is created to save the setups. Details of the job output setup file will be described later using FIG. 10 and the subsequent figures.

If the user wants to print in accordance with the changed setup contents as in the previewer 306, the spool file manager 304 issues a print request. The print request is sent to the graphic engine 202, and a print command is sent to the printer driver 203 via the dispatcher 301, thus executing the print process.

On the window (FIG. 16) of the spool file manager, the user can designate to combine a plurality of print jobs to execute them as a single print job. This process is also premised on the "store"-designated job on the property window of the printer driver shown in FIG. 9 as in the preview and setup change processes.

When the user wants to combine print jobs, he or she calls the printer driver 203 from the application 201, and selects "store" from the user interface shown in FIG. 9. With this selection, the print job is stored in the spool file 303, and the window (FIG. 16) of the spool file manager pops up, as shown in FIG. 16. The spooled job is displayed as a list on the window of the spool file manager. By repeating the same operation from the application 201, a plurality of jobs are spooled, and a list of jobs is displayed on the window of the spool file manager 304.

When the user selects a plurality of jobs from the list and designates "combine", the setup change editor 307 stored in the external memory 111 is loaded onto the RAM 102 and is instructed to display the processing setups of the first job on the list or default setups. Then, a combine setup window shown in FIG. 18 is displayed. In this embodiment, the same window as the setup change window is used as the combine setup window, but another window may be used.

The setup change editor 307 processes each page description file of intermediate codes included in the spool file 303 in accordance with the contents of the processing setups included in job setup information stored in the spool file 303, and outputs the processed data for all jobs designated as the combined job to its own client area using the graphic engine 202, thus outputting these jobs on the screen. In this case, small preview images of all the selected jobs can be displayed on the preview region shown in FIG. 18. Upon generating the combined job, a job output setup file that expands the job setup files of the individual jobs is generated. This job output setup file is also generated in the job edit process. That is, one job output setup file is generated for each job and also for the combined job.

In this case, images of the individual jobs may be displayed using the processing setups before they are combined, or may be displayed by changing and correcting their setups to common processing setups of the combined job. In this case, the user interface on the setup change editor 307 may have items that the printer driver 203 can set, or the user interface of the printer driver 203 itself may be called.

When the combined job and changed items are confirmed in accordance with a confirmation request on the setup change editor 307, as described above, the control shifts to the spool file manager 304. With these operations, the plurality of jobs selected previously are displayed as a single combined job on the window of the spool file manager.

When the user wants to print in accordance with the changed setup contents as in the previewer 306, the spool file manager 304 issues a print request. The print request is sent to the graphic engine 202, and a print command is sent to the printer driver 203 via the dispatcher 301, thus executing the print process.

<Arrangement of Laser Beam Printer>

Figure 4:
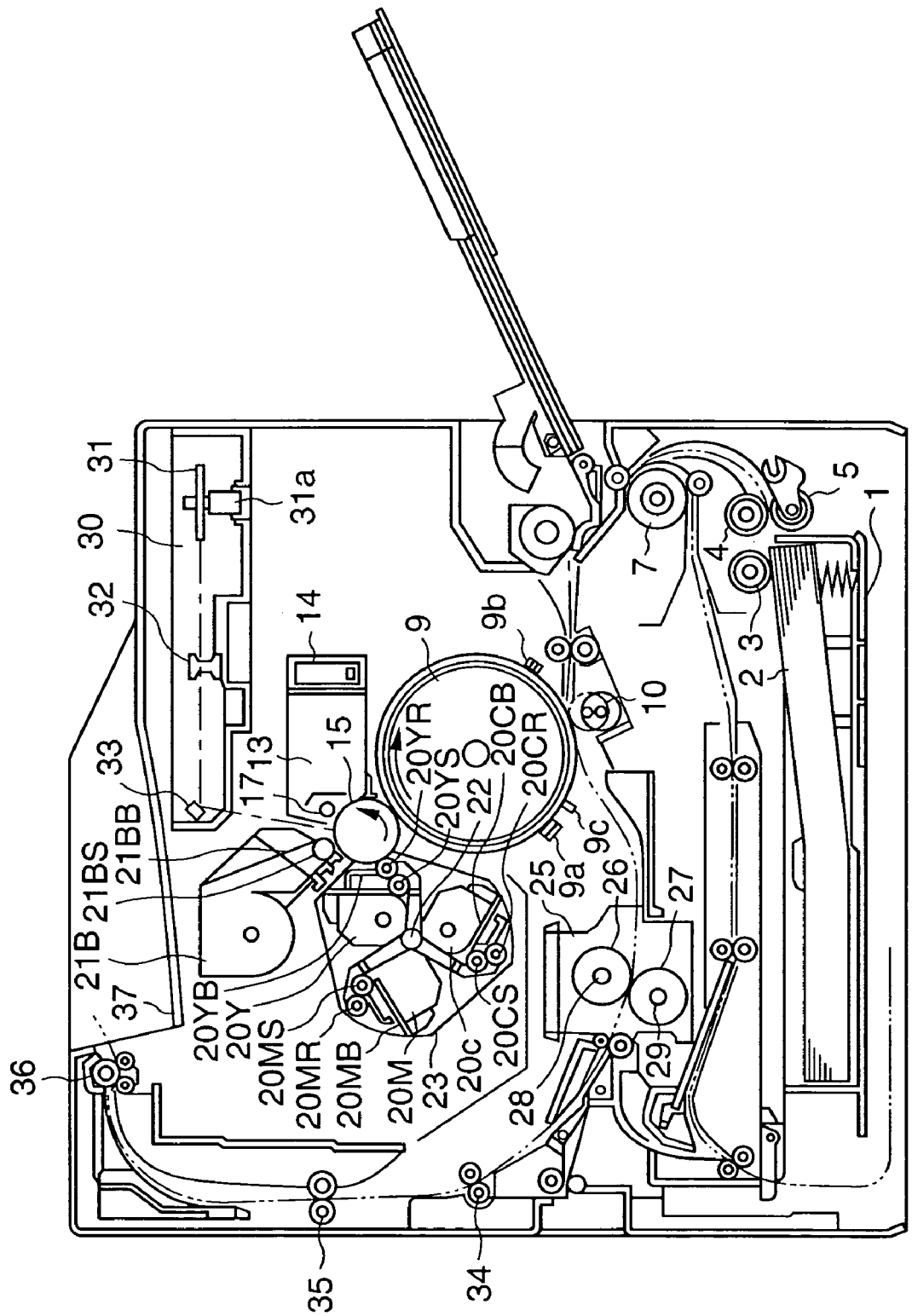
FIG. 4 is a sectional view for explaining the printer in the present invention.

FIG. 4 is a sectional view of a color laser printer having a two-sided print function as an example of the printer 1500.

This printer forms an electrostatic latent image by scanning the surface of a photosensitive drum 15 with a laser beam modulated by image data of each color obtained based on print data input from the host computer 3000 by a polygonal mirror 31. The electrostatic latent image is developed by toner to obtain a visible image, and visible images of all colors are transferred in turn onto an intermediate transfer drum 9 to form a color visible image. The color visible image is transferred onto a transfer medium 2, thus fixing the color visible image on the transfer medium 2. An image forming unit that makes the aforementioned control comprises a drum unit 13 having the photosensitive drum 15, a primary charger having a contact charging roller 17, a cleaning unit, a developing unit, the intermediate transfer drum 9, a paper feed unit including a paper cassette 1 and various rollers 3 and 4, a transfer unit including a transfer roller 10, and a fixing unit 25.

The drum unit 13 integrates the photosensitive drum (photosensitive body) 15 and a cleaner container 14 which has a cleaning mechanism that also serves as a holder of the photosensitive drum 15. The drum unit 13 is detachably supported on a printer main body, and is easily exchanged as a unit in correspondence with the service life of the photosensitive drum 15. The photosensitive drum 15 is prepared by applying an organic photoconductor layer on the outer surface of an aluminum cylinder, and is rotatably supported by the cleaner container 14. The photosensitive drum 15 rotates upon receiving the driving force of a driving motor (not shown), and the driving motor rotates the photosensitive drum 15 counterclockwise in accordance with image forming operation. An electrostatic latent image is formed by selectively exposing the surface of the photosensitive drum 15. In a scanner unit 30, a modulated laser beam is reflected by the polygonal mirror which rotates by a motor 31a in synchronism with the horizontal sync signal of an image signal, and strikes the photosensitive drum via a lens 32 and reflection mirror 33.

The developing unit comprises three color developers 20Y, 20M, and 20C for developing yellow (Y), magenta (M), and cyan (C) images, and a single black developer 21B for developing a black (B) image. The color developers 20Y, 20M, and 20C and the black developer 21B respectively have sleeves 20YS, 20MS, 20CS, and 21BS, and coating blades 20YB, 20MB, 20CB, and 21BB which are in press contact with the outer surfaces of these sleeves 20YS, 20MS, 20CS, and 21BS. Also, the three color developers 20Y, 20M, and 20C respectively have coating rollers 20YR, 20MR, and 20CR.

The black developer 21B is detachably attached to the printer main body, and the color developers 20Y, 20M, and 20C are detachably attached to a developing rotary 23 which rotates about a rotation shaft 22.

The sleeve 21BS of the black developer 21B is set to have a gap as small as, e.g., 300 μm with respect to the photosensitive drum 15. In the black developer 21B, toner is fed by a feed member built in the developer, and is applied by the coating blade 21BB to the outer surface of the sleeve 21BS which rotates clockwise, thus charging the toner by triboelectrification. By applying a developing bias to the sleeve 21BS, the photosensitive drum 15 undergoes development in accordance with an electrostatic latent image, thus forming a visible image on the photosensitive drum 15 by black toner.

The three color developers 20Y, 20M, and 20C rotate upon rotation of the developing rotary 23 in image formation, and a predetermined one of the sleeves 20YS, 20MS, and 20CS faces the photosensitive drum 15 to have a gap as small as 300 µm. In this manner, a predetermined one of the color developers 20Y, 20M, and 20C stops at the developing position where it faces the photosensitive drum 15, thus forming a visible image on the photosensitive drum 15.

Upon forming a color image, the developing rotary 23 rotates once per rotation of the intermediate transfer drum 9 to execute developing processes in the order of the yellow developer 20Y, magenta developer 20M, cyan developer 20C, and black developer 21B. After four rotations of the intermediate transfer drum 9, visible images are formed in turn by yellow, magenta, cyan, and black toners, thus forming a full-color visible image on the intermediate transfer drum 9.

The intermediate transfer drum 9 contacts the photosensitive drum 15 and rotates upon rotation of the photosensitive drum 15. The drum 9 rotates clockwise upon forming a color image, and four visible images are transferred in turn onto the drum 9 from the photosensitive drum 15. The transfer roller 10 (to be described later) contacts the intermediate transfer drum 9 upon forming an image, and clamps and conveys a transfer medium 2, thus simultaneously transferring a color visible image on the intermediate transfer roller 9 onto the transfer medium 2. A TOP sensor 9a and RS sensor 9b for detecting the position of the intermediate transfer drum 9 in its rotational direction, and a density sensor 9c for detecting the density of the toner image transferred onto the intermediate transfer drum are arranged around the intermediate transfer drum.

The transfer roller 10 comprises a transfer charger which is supported to be movable toward or away from the photosensitive drum 15, and is prepared by winding a middle-resistance foamed elastic member around a metal shaft.

The transfer roller 10 is located at its lower position, as indicated by the solid line in FIG. 4, so as not to disturb color visible images, while color visible images are transferred in turn onto the intermediate transfer drum 9. After the four color visible images are formed on the intermediate transfer drum 9, the transfer roller 10 moves to its upper position indicated by the dotted line in FIG. 1 by a cam member (not shown) in synchronism with the transfer timing of the formed full-color visible image onto the transfer medium 2. In this manner, the transfer roller 10 is brought into press contact with the intermediate transfer drum 9 at a predetermined pressure via the transfer medium 2, and is applied with a bias voltage, thus transferring the full-color visible image on the intermediate transfer drum 9 onto the transfer medium 2.

The fixing unit 25 fixes the transferred full-color visible image while conveying the transfer medium 2, and comprises a fixing roller 26 for heating the transfer medium 2, and a pressing roller 27 for pressing the transfer medium 2 against the fixing roller 26. The fixing roller 26 and pressing roller 27 are formed into a hollow shape, and heaters 28 and 29 are respectively built therein. That is, the transfer medium 2 that holds the full-color visible image is conveyed by the fixing roller 26 and pressing roller 27, and the toner image is fixed on its surface by applied heat and pressure.

After the visible image is fixed, the transfer medium 2 is exhausted onto an exhaust unit 37 via exhaust rollers 34, 35, and 36, thus ending the image forming operation.

The cleaning means cleans any residual toner on the photosensitive drum 15 and intermediate transfer drum 9, and waste toner after the toner image formed on the photosensitive drum 15 is transferred onto the intermediate transfer drum 9 or waste toner after the four color visible images formed on the intermediate transfer drum 9 are transferred onto the transfer medium 2 is stored in the cleaner container 14.

The transfer medium (recording sheet) 2 which is to undergo a print process is picked up from the paper tray or cassette 1 by the roller 3, and is conveyed while being clamped between the intermediate transfer roller 9 and transfer roller 10 to record a color toner image thereon. The toner image is fixed when the transfer medium 2 passes through the fixing unit 25. A guide 38 forms a convey path to guide the recording sheet toward the upper exhaust unit in a one-sided print process, but forms a path to guide it to a lower two-side unit in a two-sided print process.

The recording sheet guided to the two-side unit is temporarily fed to a portion (a convey path indicated by the two-dashed chain line) below the tray 1 by convey rollers 40, is then conveyed in the reverse direction, and is fed to a two-side tray 39. On the two-side tray 39, the paper sheet is upside down to that placed on the paper tray 1, and its convey direction is reversed. In this state, a toner image is transferred and fixed again, thus achieving the two-sided print process.

<Saving Process of Print Intermediate Data>

Figure 5:
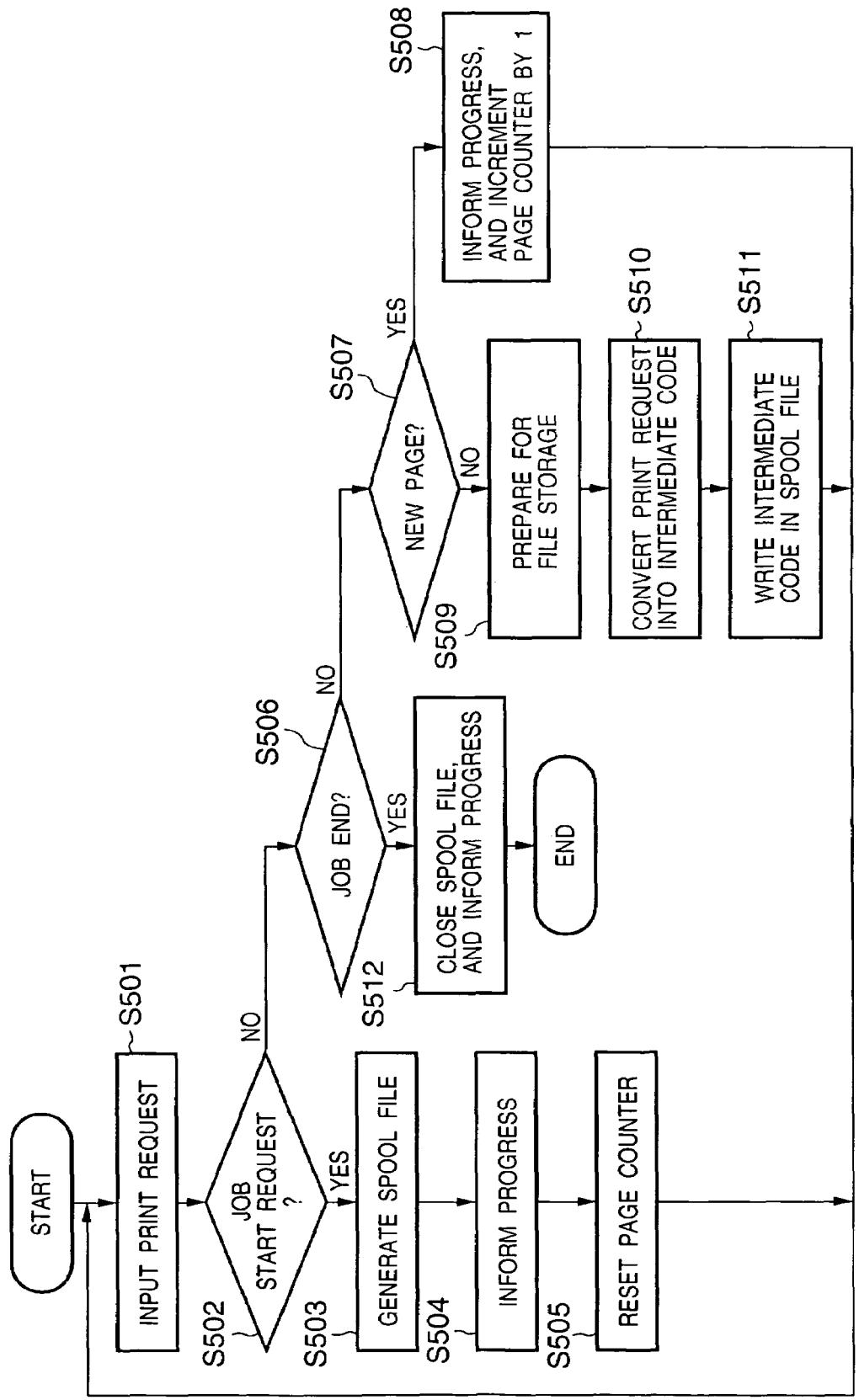
FIG. 5 is a flow chart showing the process in a spooler 302.

FIG. 5 is a flow chart showing the processing in the step of saving in units of pages upon generating the spool file 303 in the spooler 302.

Figure 8:
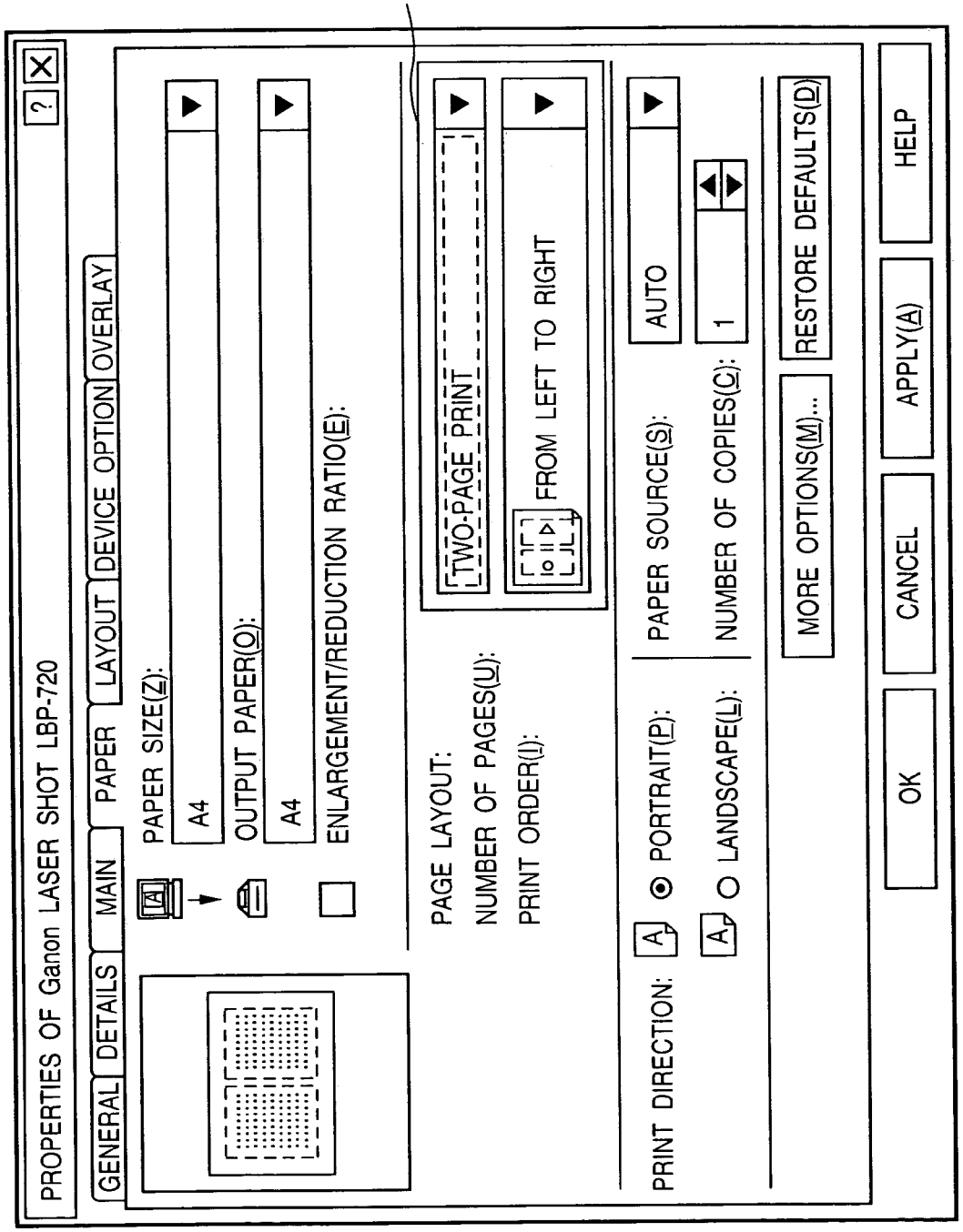
FIG. 8 shows an example of a print setup window.

In step 501, the spooler 302 receives a print request from the application via the graphic engine 202. The application displays a dialog that prompts the user to input print setups, as shown in FIG. 8, and the print setups input on this dialog are passed from the printer driver to the spooler 303. The setup input dialog shown in FIG. 8 includes a setup item 801 that determines the number of logical pages to be laid out per physical page, and the like.

In step 502, the spooler 302 checks if the received print request is a job start request. If it is determined in step 502 that the received print request is a job start request, the flow advances to step 503, and the spooler 302 generates a spool file 303 for temporarily saving intermediate data. Subsequently, the spooler 302 informs the spool file manager 304 of the progress of the print process in step 504, and resets its page counter to 1 in step 505. The spool file manager 304 reads and stores information, processing setups, and the like of a job, the print process of which has started, from the spool file 303.

On the other hand, if it is determined in step 502 that the received print request is not a job start request, the flow advances to step 506.

The spooler checks in step 506 if the received request is a job end request. If it is determined that the received request is not a job end request, the flow advances to step 507 to check if the received request is a new page request. If it is determined in step 507 that the received request is a new page request, the flow advances to step 508 to inform the spool file manager 304 of the progress of the print process. The spooler 302 then increments the page counter, closes a page description file that stores intermediate codes, and generates the next page description file.

If it is determined in step 507 that the received print request is not a new page request, the flow advances to step 509, and the spooler 302 prepares for export of intermediate codes to a page description file.

In step 510, the spooler 302 converts a DDI function of the print request into intermediate codes to store the print request in the spool file 303. In step 511, the spooler 302 writes the print request (intermediate codes) that has been converted into a storable format in a page description file of the spool file 303 in step 510. After that, the flow returns to step 501 to receive a print request from the application again. The spooler 302 repeats a series of processes from steps 501 to 511 until it receives a job end request (EndDoc). The spooler 302 simultaneously acquires information such as processing setups and the like stored in the DEVMODE structure from the printer driver, and stores such information in the spool file 303 as a job setup file. On the other hand, if it is determined in step 506 that the print request from the application is a job end request, since the spooler 302 has received all print requests from the application, the flow advances to step 512 to inform the spool file manager 304 of the progress of the print process, thus ending the processing.

<Generation of Spool File>

Figure 6:
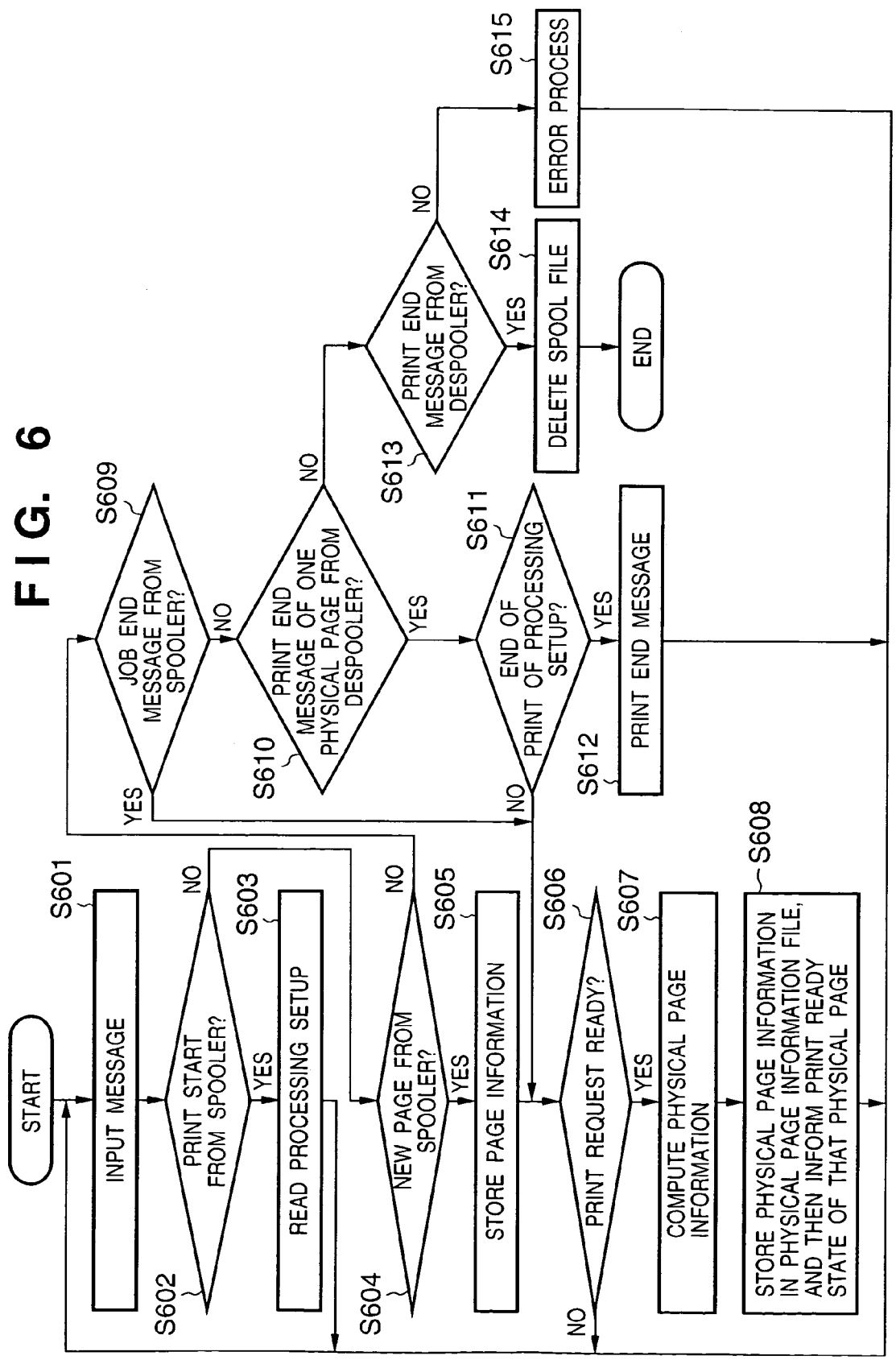
FIG. 6 is a flow chart showing print control in a spool file manager 304.

FIG. 6 is a flow chart showing details of control between the spool file 303 generation process and a print data generation process (to be described later) in the spool file manager 304.

In step 601, the spool file manager 304 receives a print process progress message from the spooler 302 or despooler 305.

The spool file manager 304 checks in step 602 if the progress message is a print start message which is sent from the spooler 302 in step 504 described above. If YES in step 602, the flow advances to step 603, and the spool file manager 304 reads the print processing setups from the spool file 303 to start job management.

On the other hand, if it is determined in step 602 that the received progress message is not a print start message from the spooler 302, the flow advances to step 604, and the spool file manager 304 checks if the progress message is a print end message of one logical page which is sent from the spooler 302 in step 508 mentioned above. If the progress message is a print end message of one logical page, the flow advances to step 605 to store logical page information for that logical page.

It is then checked in step 606 if a print process of n logical pages that have been spooled at that time onto one physical page can start. If YES in step 606, the flow advances to step 607 to determine a physical page number on the basis of the number of logical pages assigned to one physical page to be printed.

As for a computation of a physical page, for example, when the processing setups lay out four logical pages on one physical page, the first physical page becomes ready for print when the fourth logical page has been spooled, thus determining the first physical page. Subsequently, the second physical page becomes ready for print when the eighth logical page has been spooled.

Also, even when the total number of logical pages is not a multiple of the number of logical pages to be laid out per physical page, logical pages to be laid out per physical page can be determined by a spool end message in step 512.

Figure 10:
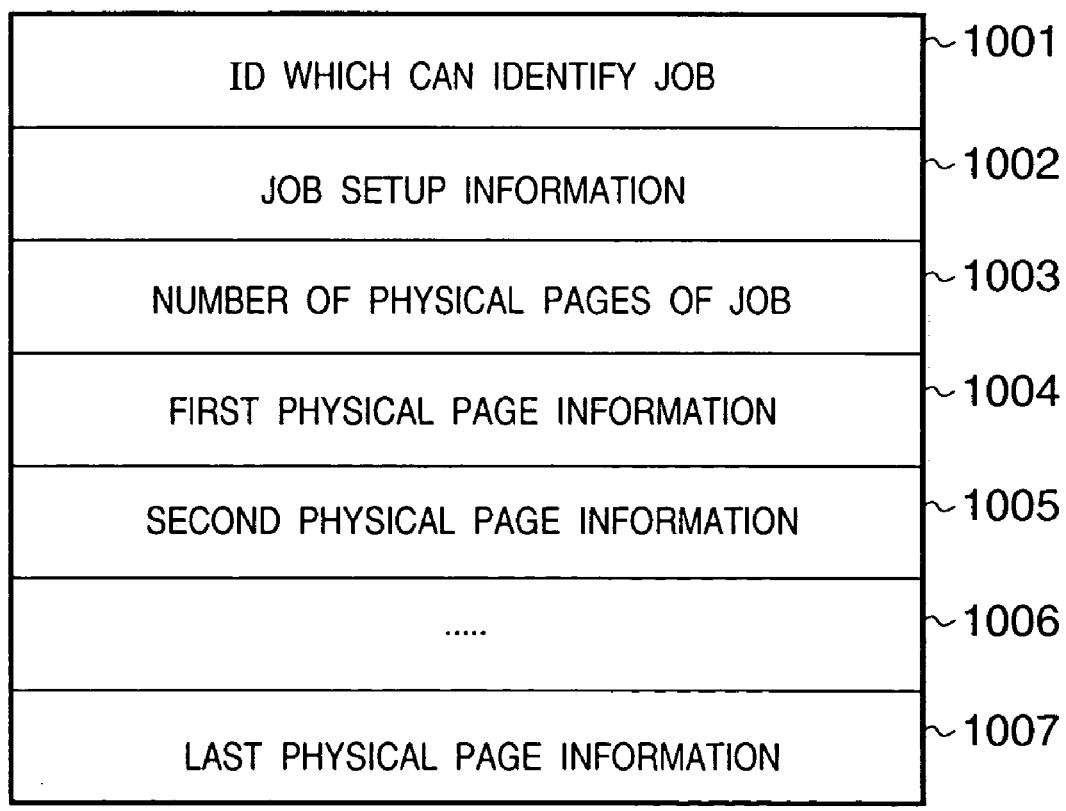
FIG. 10 shows an example of a data format to be passed when the spool file manager 304 issues a print request of a physical page to the despooler 305.

In step 608, the spool file manager 304 saves information such as the logical page numbers which form the physical page that is ready for print, the physical page number of that physical page, and the like in a job output setup file (a file including physical page information) in the format shown in FIG. 10, and informs the despooler 305 that physical page information for one physical page has been added. After that, the flow returns to step 601 to wait for the next message. In this embodiment, when print data for one page, i.e., logical pages that form one physical page have been spooled, a print process can start even when print jobs to be spooled still remain.

On the other hand, if it is determined in step 604 that the progress message is not a print end message of one logical page, the flow advances to step 609, and the spool file manager 304 checks if the progress message is a job end message sent from the spooler 302 in step 512 mentioned above. If YES in step 609, the flow advances to step 606 described above.

On the other hand, if the progress message is not a job end message, the flow advances to step 610, and the spool file manager 304 checks if the received message is a print end message of one physical page from the despooler 305. If the received message is a print end message of one physical page, the flow advances to step 611 to check if print processes for the processing setups are complete. If YES in step 611, the flow advances to step 612 to send a print end message to the despooler 305.

On the other hand, if it is determined that print processes for the processing setups are not complete yet, the flow advances to step 606 described above. The despooler 305 in this embodiment assumes one physical page as a unit for the print process. In step 608, information required for executing the print process of one physical page is saved in a file, so that such information can be used again. However, if such information need not be used again, a high-speed medium such as a shared memory or the like may be used to overwrite information in turn in units of physical pages, thus achieving both high processing speed and resource savings. On the other hand, when the progress of spooling is faster than that of despooling, or when despooling starts after completion of spooling of all pages, a message indicating that a plurality of physical pages or all physical pages are ready for print is sent in accordance with the progress on the despooling side in place of sending a page print ready message for each physical page in step 608, thus reducing the number of messages.

If it is determined in step 610 that the message is not a print end message of one physical page from the despooler, the flow advances to step 613, and the spool file manager 304 checks if the message is a print end message from the despooler 305. If it is determined that the message is a print end message from the despooler 305, the flow advances to step 614, and the spool file manager 304 deletes the corresponding page description files in the spool file 303, thus ending the processing. On the other hand, if the message is not a print end message from the despooler 305, the flow advances to step 615 to execute another normal process and to then wait for the next message.

<Output of Spool File>

Figure 7:
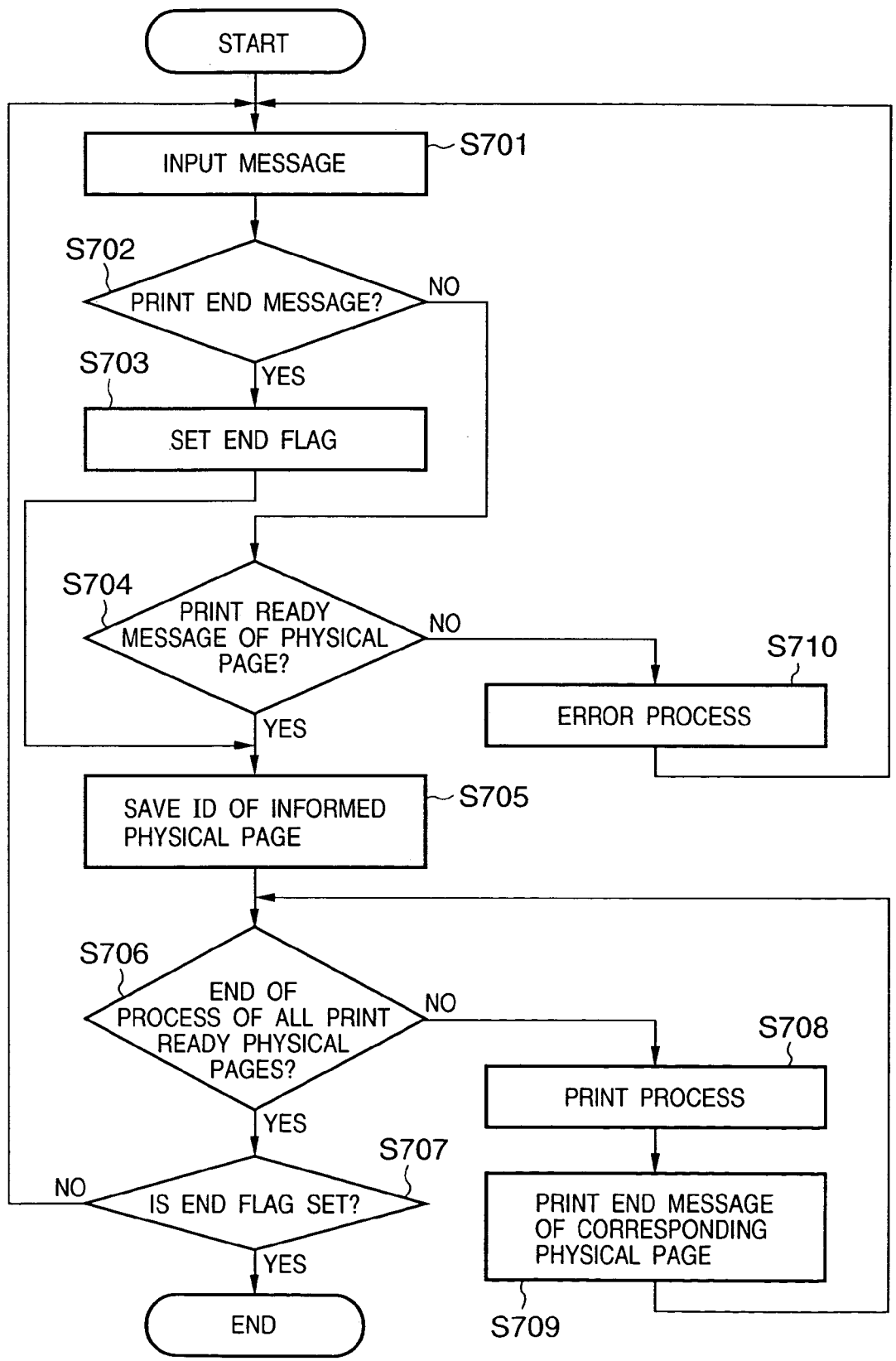
FIG. 7 is a flow chart showing the process in a despooler 305.

FIG. 7 is a flow chart showing details of the print data generation process in the despooler 305.

The despooler 305 reads out required information (page description file and job setup file) from the spool file 303 in response to the print request from the spool file manager 304, and generates print data. The method of transferring the generated print data to the printer has already been explained with reference to FIG. 3.

Upon generating print data, the despooler 305 receives a message from the spool file manager 304 in step 701. The despooler 305 checks in step 702 if the input message is a job end message. If YES in step 702, the flow advances to step 703 to set an end flag, and the flow then jumps to step 705.

On the other hand, if it is determined in step 702 that the received message is not a job end message, the flow advances to step 704 to check if the print start request of one physical page in step 608 mentioned above is received. If it is determined in step 704 that the received message is not a start request, the flow advances to step 710 to execute an error process, and the flow returns to step 701 to wait for the next message. On the other hand, if it is determined in step 704 that the received message is a print start request of one physical page, the flow advances to step 705, and the despooler 305 saves the IDs of physical pages, the print ready message of which was received in step 704.

The despooler 305 checks in step 706 if print processes of all pages of the physical page IDs saved in step 705 are complete. If YES in step 706, the flow advances to step 707 to check if the end flag was set in step 703 mentioned above. If YES in step 707, the despooler 305 determines that the job print process is complete, and sends its processing end message to the spool file manager 304, thus ending the processing.

If it is determined in step 707 that the end flag is not set, the flow returns to step 701 to wait for the next message. If it is determined in step 706 that physical pages which are ready for print still remain, the flow advances to step 708. In step 708, the despooler 305 reads out unprocessed physical page IDs in turn from the saved physical page IDs, reads information required for generating print data of a physical page corresponding to each readout physical page ID, and executes a print process. The print process is done by converting by the despooler 305 a print request command stored in the spool file 303 into a format (GDI function) that the graphic engine 202 can recognize, and transferring it to the printer driver.

As for the processing setups that lay out a plurality of logical pages on one physical page (to be referred to as an N-page print process hereinafter) as in this embodiment, conversion in this step is done in consideration of the layout upon reduction in scale. Upon completion of the required print process, the despooler 305 sends a print data generation end message of one physical page to the spool file manager 304 in step 709. The flow returns to step 706 to repeat the aforementioned processes until print processes for all the physical page IDs of print ready pages, which were saved in step 705, are complete.

The flow of the print process using the dispatcher 301, spooler 302, spool file manager 304, and despooler 305 has been explained. With the above process, since the application 201 is released from the print process at the timing at which the spooler 302 generates intermediate codes and stores them in the spool file 303, the application 201 can be released earlier than a case wherein a print command is directly output to the printer driver 203. Since intermediate files (page description file, job setup file) that consider the print setups of the printer driver are temporarily saved in the spool file 303, the user can recognize a print preview of an image to be actually printed, and can combine or sort print jobs generated by a plurality of applications. Also, the user can change print setups to execute a print process without launching the application again.

In the print process using the spooler 302, a job output setup file is generated when the despooler 305 issues a print request to the graphic engine, and is also generated when the preview process, job combine process, or the like is done. The job output setup file is equivalent to a job setup file in case of an independent job, and is generated based on a plurality of pieces of job setup information in case of a combined job. The job output setup file will be explained below.

<Configuration of Job Output Setup File>

FIG. 10 shows an example of the job output setup file that saves information which is generated by the spool file manager 304 in step 608, and forms a print ready physical page. A field 1001 holds an ID that identifies a job, and may be held in the form of the name of a file or shared memory which saves this information. A field 1002 stores job setup information. The job setup information includes information unique to each job, such as a structure required for starting a job print process with respect to the graphic engine 202, designation of an N-page print process, designation of additional rendering of a page frame or the like, the number of copies, finishing designation such as staple, and the like. The job setup information in the field 1002 saves a required number of information in correspondence with the functions for a job. A field 1003 stores the number of physical pages of a job, and indicates the number of pieces of physical page information in correspondence with the value stored therein. Since this embodiment informs the number of physical pages which are ready for print, this field may be omitted. Fields 1004 to 1007 store physical page information in correspondence with the value stored in the field 1003. The physical page information will be explained later using FIG. 12.

FIG. 11 shows an example of the job setup information in the field 1002 shown in FIG. 10. A field 1101 stores the total number of physical pages. A field 1102 stores the total number of logical pages. The fields 1101 and 1102 are used when the number of pages is printed as additional information in addition to print data. While a print process continues, these fields store tentative values, or the spool file manager 304 postpones generation of information of print ready physical pages until the print process ends. A field 1103 stores information indicating the number of copies to be printed of the print job of interest. A field 1104 stores information that designates if a print process is done in units of copy sets, when information set in the field 1103 indicates a print process of a plurality of sets of copies. A field 1105 stores finishing information such as staple, punch, Z-fold, and the like, which information is designated when a finisher is available on the printer main body or an external device. A field 1106 stores additional print information, which saves information to be added to a job such as decoration including a page frame or the like, additional information including a date or the like, the user name, the number of pages, watermark print, and the like. The number of fields included in this job setup information increases with increasing number of functions. For example, when a two-sided print function is available, a field for saving designation of two-sided print is added.

Figure 12:
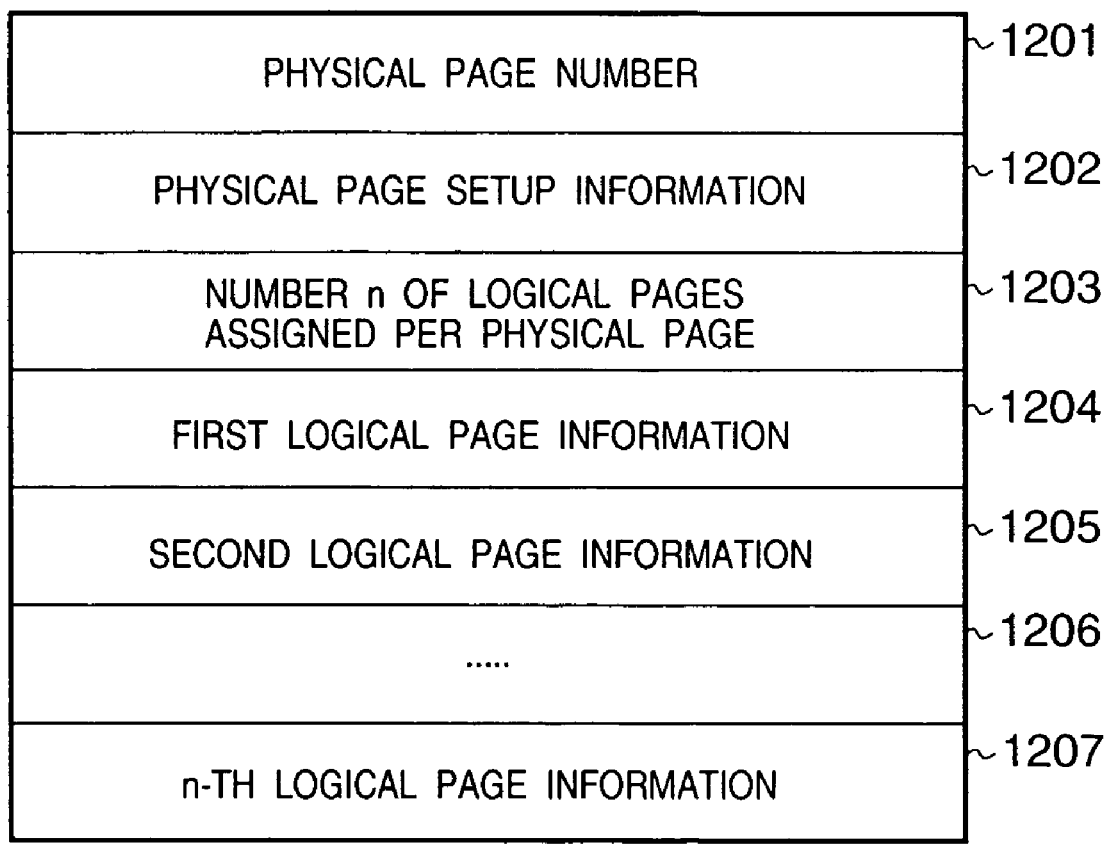
FIG. 12 shows an example of a data format to be passed when the spool file manager 304 issues a print request of a physical page to the despooler 305.

FIG. 12 shows an example of the physical page information in the field 1004 shown in FIG. 10. A first field 1201 stores a physical page number, which is a value used when the print order is managed or a physical page number is additionally printed. A field 1202 stores physical page setup information, which saves layout or color/monochrome setups when a layout or color/monochrome mode can be designated in units of physical pages. A field 1203 stores the number of logical pages assigned to the physical page of interest, and saves a value "4" or an ID indicating 4-page print when four pages are assigned per physical page.

A field 1204 and the subsequent fields save information of logical pages in correspondence with the number designated in the field 1203. Depending on the number of pages printed from the application 201, the actual number of page data sometimes becomes smaller than the number of pages designated by the field 1203. In such case, logical page information saves special data indicating a blank page.

Figure 13:
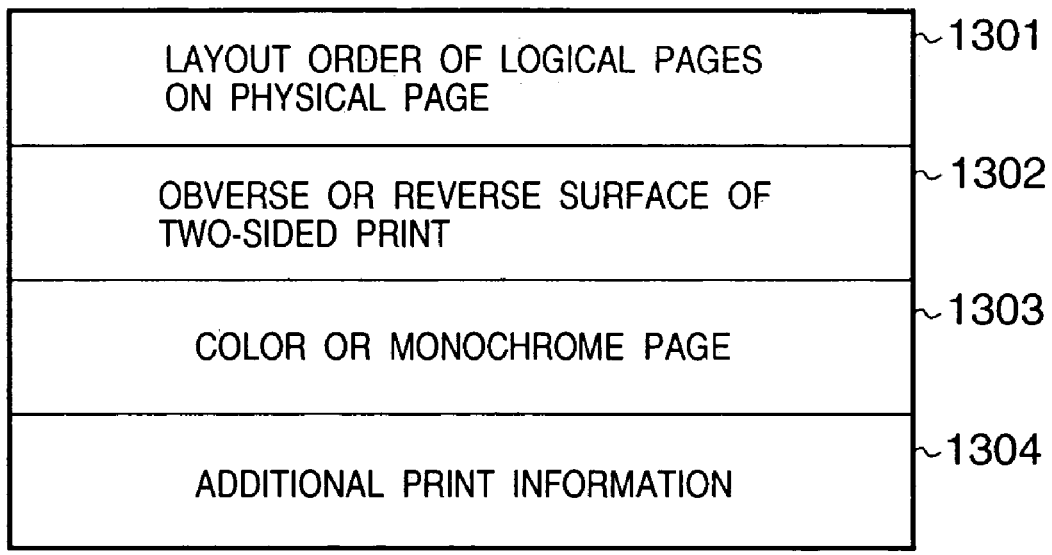
FIG. 13 shows an example of a data format to be passed when the spool file manager 304 issues a print request of a physical page to the despooler 305.

FIG. 13 shows an example of the physical page setup information in the field 1202. A field 1301 stores the layout order of logical pages on a physical page, and saves designation of the order that logical pages are laid out on a physical page (from upper left to right, from upper left to lower, and the like) in an N-page print process. In some systems, the field 1204 and the subsequent fields that store logical page information may be arranged not in a page number order but in the layout order in place of the setups in the field 1301.

A field 1302 stores information indicating the obverse or reverse surface of the two-sided print, which is used when, e.g., binding margins are to be formed on identical sides on the obverse and reverse surfaces. A field 1303 stores designation of a color or monochrome page, which is a value used when a printer has both monochrome and color modes, and color and monochrome pages of a document that includes both color and monochrome pages are to be printed in the color and monochrome modes, respectively. With this information, the color printer can change processes in units of pages as an auto color mode. That is, transfer control is done for a color page by completing rotations of an intermediate transfer member (intermediate transfer drum or belt) or transfer member (transfer drum or belt) in correspondence with the number of device colors (four rotations in case of YMCK), and for a monochrome page by completing one rotation for black.

A field 1304 stores additional print information, which is used when additional information such as the number of pages, date, or the like is printed on a physical page. In the physical setup information, the number of fields increases in correspondence with the number of functions of the system.

Figure 14:
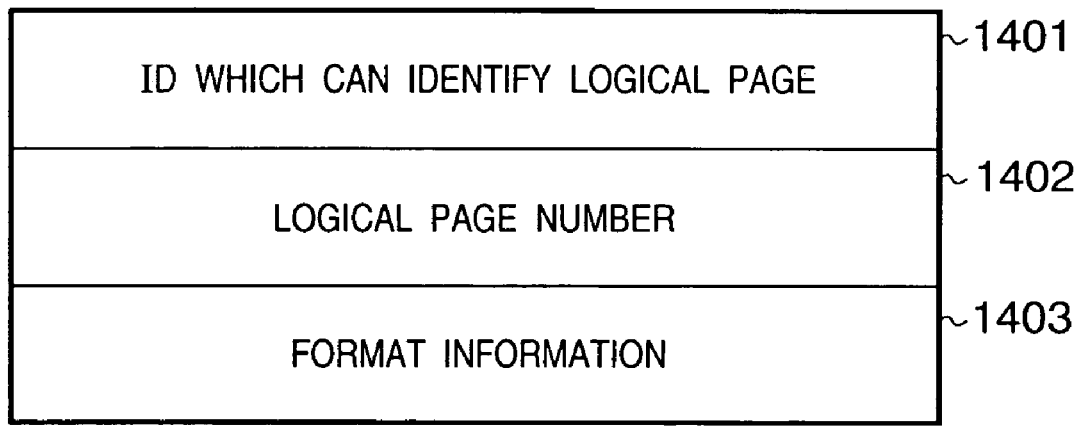
FIG. 14 shows an example of a data format to be passed when the spool file manager 304 issues a print request of a physical page to the despooler 305.

FIG. 14 shows an example of logical page information stored in the field 1204. A field 1401 stores the ID of a physical page. Using this ID, an intermediate code of a page description file corresponding to the logical page of interest is looked up from the spool file 303. This field may store a file or memory pointer, or an intermediate code itself that forms a logical page, as long as the intermediate code of a logical page can be accessed using this ID.

A field 1402 stores a logical page number, which is used when the logical page number is printed as additional information or as auxiliary information of the logical page ID. Format information in a field 1403 saves various setup items that can be designated in units of logical pages. For example, the format information saves additional print information such as a page frame and various kinds of setup information designated in units of logical pages such as an enlargement/reduction ratio and the like. Also, the format information can save attribute information of a logical page such as color/monochrome information in units of logical pages if necessary. Conversely, if a system need not switch setups in units of local pages or does not require any attribute information in units of logical pages, the field 1403 can be omitted.

The job output setup file has the aforementioned configuration. Note that the job setup file has nearly the same configuration. The job setup file saves a print method (one-sided, two-sided, bookbinding print), a print layout (N-up, poster print), additional information (addition of watermark, date, user name), the number of copies, and paper size information for each job. Also, the job setup file saves the layout order of logical pages, information indicating the obverse or reverse surface of two-sided print, color mode information, and the like in units of physical pages.

Furthermore, FIG. 3 shows the example in which the setup change editor 307 having a function of changing the setups of a job is added to the expanded system described so far. In this embodiment, the setup contents of an independent job are contained in a job setup file, and those of a combined job are contained in a job output setup file shown in FIG. 10. In addition, these files are independent from the page description file that saves intermediate codes. Hence, the setups of each job can be changed by editing the job output setup file. The setup change editor 307 edits or partially rewrites the job output setup file solely or in collaboration with the spool file manager 304, thus implementing the job setup change function.

<Processing Sequence of Setup Change>

Figure 15:
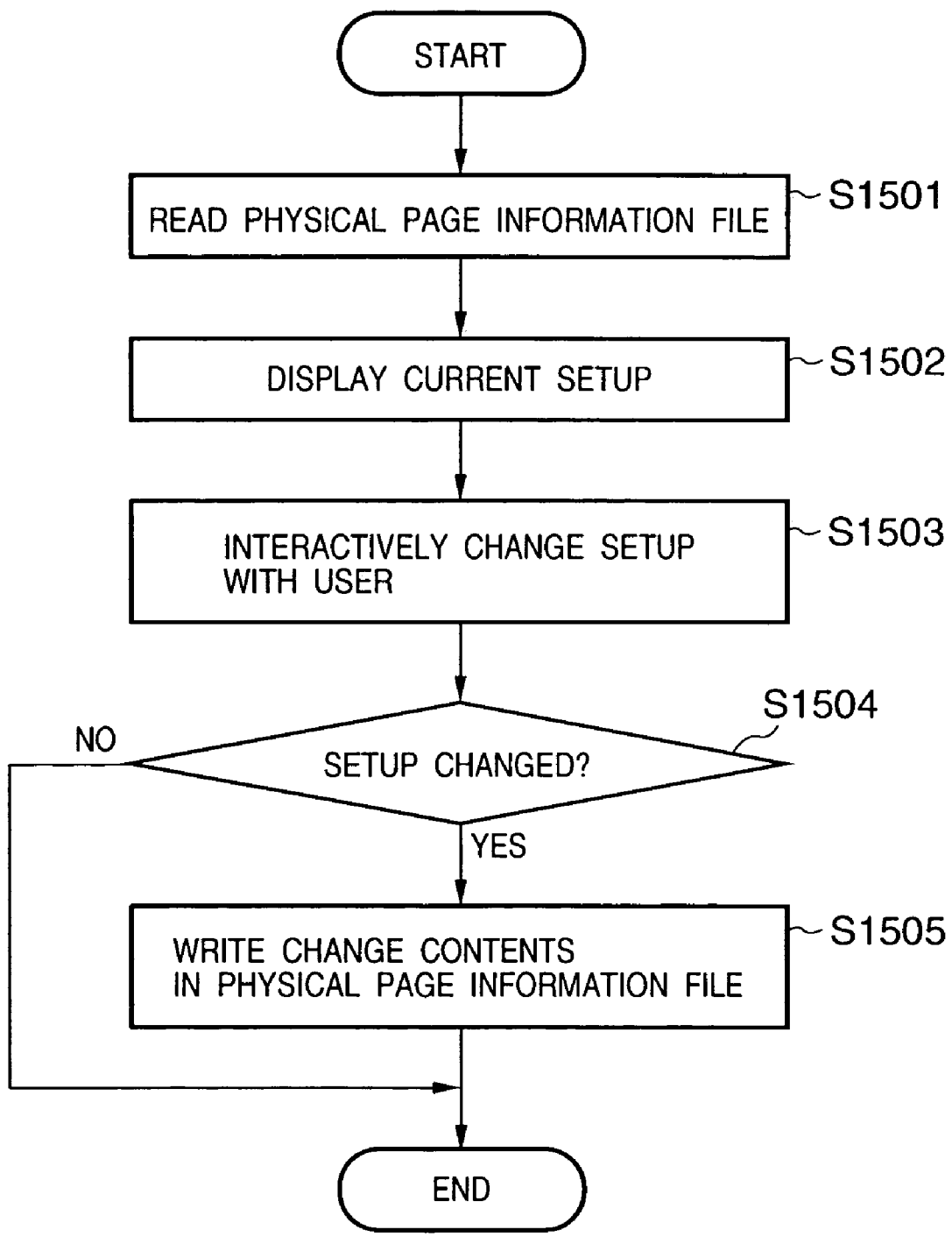
FIG. 15 is a flow chart showing a setup change process in a setup change editor 307.

FIG. 15 is a flow chart showing details of the job setup change process in the setup change editor 307.

In step 1501, the setup change editor reads a job setup file or job output setup file. The job output setup file is the same file as that read by the previewer 306 and despooler 305.

The flow advances to step 1502 to display the read result to the user. In step S1503, the setup change editor interactively changes the setup contents by the aforementioned menu designation and the like with the user on the user interface shown in FIG. 18. This step may be attained in a batch manner that changes contents in accordance with setup change contents written in a file or the like in place of the interactive manner.

The flow advances to step 1504, and the setup change editor compares the initially read contents and the currently designated setup contents to check if the contents have been changed. If the setup contents have been changed, the flow advances to step 1505 to generate a new job output setup file and inform the spool manager file of the changes, thus ending the processing. If it is determined in step 1504 that the setup changes are not changed, the setup change editor informs the spool file manager of that fact, thus ending the processing.

A new job output setup file is generated in this way. When an "OK" button 1801 ifs selected on the user interface window in FIG. 18, the new job output setup file is enabled, and the old job output setup file is deleted. When the job setup file of an independent job has been changed in place of the job output setup file, the old file is saved without being deleted. When a "restore defaults" button 1802 is selected on the window shown in FIG. 18, the new job output setup file is deleted, and the old job output setup file is enabled and reflected in display.

This embodiment has explained the setup change editor 307 as an independent module. Alternatively, the setup change editor 307 may be a part of the user interface of the spool file manager 304. Also, the setup change editor 307 may be implemented as follows. That is, the editor 307 does not actually write change contents in the job output setup file and informs the spool file manager 304 of only the setup change contents, and the spool file manager 304 actually changes the job output setup file.

FIG. 3 shows the expanded system that combines a plurality of print jobs and prints them as a single print job. An expansion for despooling and previewing a combined job will be explained below.

Normally, spool files 303 with the intermediate format are generated in units of jobs. In case of an independent job, since a print process, setup change process, or the like is executed by sequentially reading out intermediate codes of respective logical pages in the job file to be processed, the logical page ID in the field 1401 can be implemented by a relative or absolute offset which indicates the location of each logical page in a file. In case of a combined job, a spool file and page information which belongs to that job must be specified from the job ID in the field 1401. In this embodiment, a spool file is specified by appending an ID that identifies a spool file to the logical page ID. In this case, only the field 1401 can be modified. If the spool file can be identified, read of page information can be processed by the same logic as in the process of an independent job. In another implementation, when spool files are saved as independent files in units of logical pages, the file name of each logical page may be used as the logical page ID in the field 1401.

<Preview Display in Store Process>

The sequence for displaying a print preview image on the basis of a print job saved as intermediate data and a job output setup file will be explained below. When the user designates a store process of a print job from a menu 901, as shown in FIG. 9, in the print process from the application program, a print job defined by intermediate codes and a job output setup file can be generated in the sequence shown in FIG. 5. As a result, a list of currently stored print jobs is displayed, as shown in FIG. 16. The user designates a desired print job from the print job list, and can edit the print job, combine jobs, add the print job to the already combined print job, change the order of print jobs in the combined job, and so forth.

In this case, when the user designates a given print job from the list and designates an operation such as edit, combine, or the like from the button or menu, a print preview window of the entire designated job is displayed, as shown in FIG. 18. Note that this print preview window can also display a preview image of the page relationship in the entire independent or combined print job unlike a normal preview window prepared by an application, which displays a preview image for each page.

Figure 19:
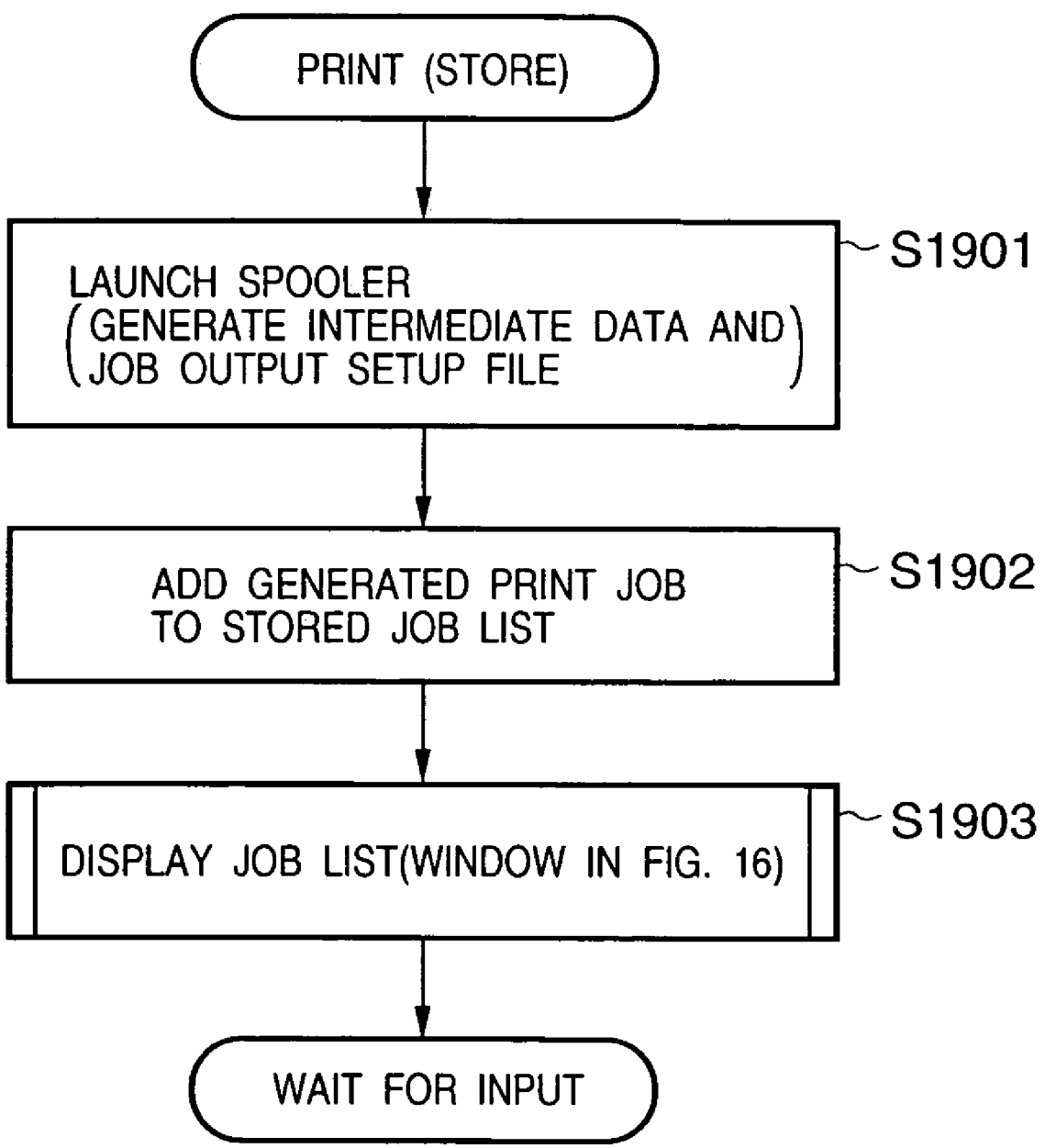
FIG. 19 is a flow chart showing the process when data created by an application program or the like is printed with store designation.

FIG. 19 shows the sequence when data created by an application program or the like undergoes a print process while designating a store process. When the user selects "store" from the menu 901 as the output destination on the window shown in FIG. 9, and starts the print process, the sequence shown in FIG. 9 is executed.

In step S1901, the spooler is launched to generate and store intermediate data and a job output setup file. When "store" is designated, the spooler does not issue any print start instruction to the spool manager, and the intermediate data are held without being printed. The print job in this state is called a stored print job in this embodiment.

The print job that has been converted into and held as intermediate data in step S1901 is added to the already stored print job list in step S1902. In this embodiment, the stored print job is held only during execution of a program (the previewer 306 and setup change editor 307 in FIG. 3) for managing stored print jobs, and is deleted upon quitting such program. However, the stored print job may be held until it is actually deleted.

When a new print job is added to the stored print job list, a list of these jobs is displayed in step S1903, as shown in FIG. 16. Note that a print job held as intermediate data is called a held job, and a job selected for the combine or edit process is called a target job.

<Display of Job List>

Figure 20:
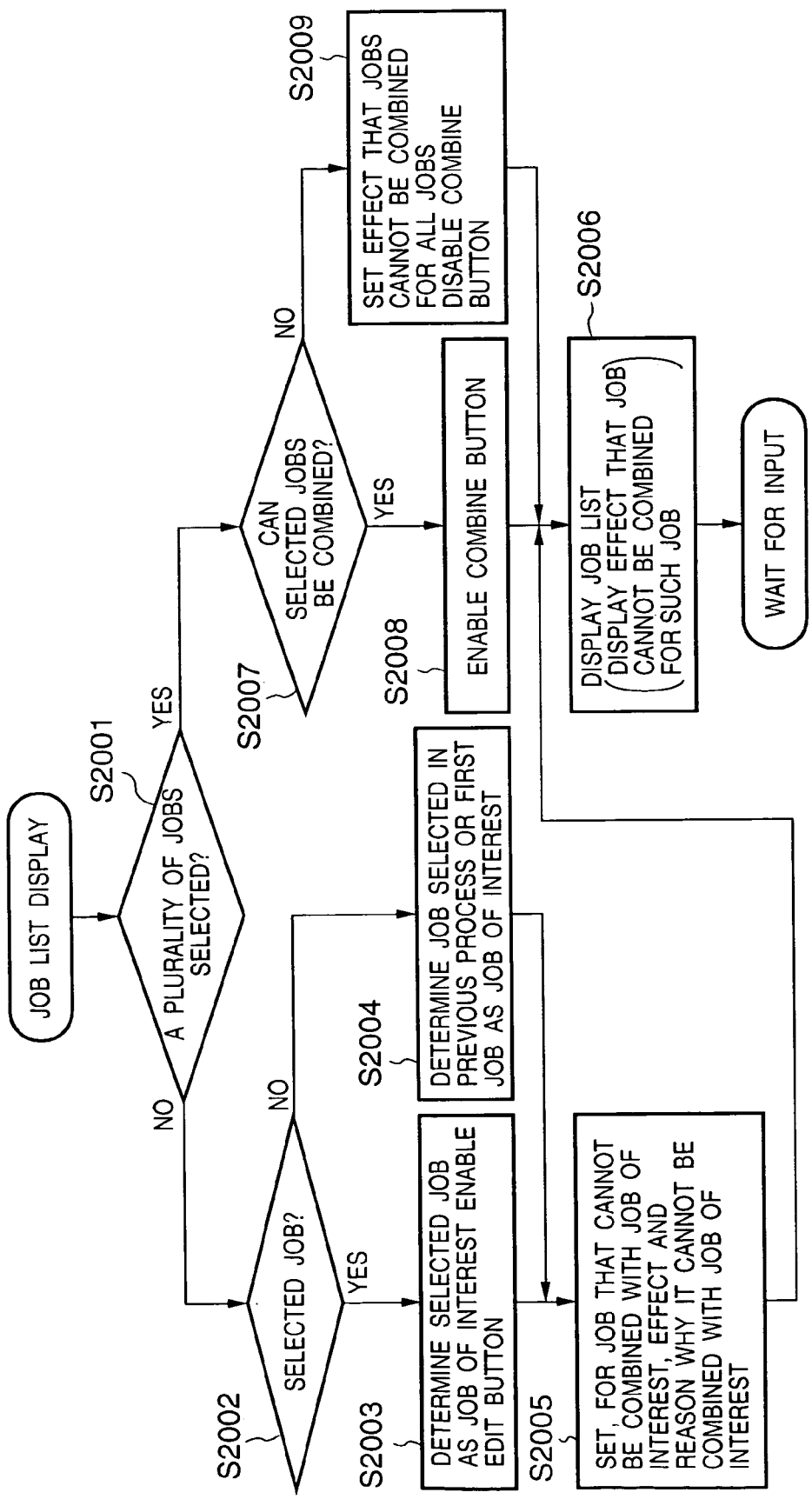
FIG. 20 is a flow chart showing details of step S1903 in FIG. 19.

FIG. 20 is a flow chart showing details of step S1903 in FIG. 19. Note that the sequence in FIG. 20 is executed every time the state to be displayed has been changed, e.g., when a job is selected from the job list, thus updating the displayed job list.

It is checked in step S2001 if a plurality of jobs are selected. If NO in step S2001, it is checked in step S2002 if a job is selected. If YES in step S2002, that job is determined as a job of interest, and an edit button is enabled. The edit button is a button 1608 in FIG. 16. FIG. 16 shows a state immediately after a single job is selected, and the edit button is enabled.

On the other hand, if no job is selected, a job which was selected in the previous process is determined as a job of interest in step S2004. If no such job is available, i.e., if the job list is displayed for the first time, the first job in the job list is determined as a job of interest.

After the job of interest is determined, a job which cannot be combined with the job of interest is picked up from the held jobs, and the effect and reason why the job cannot be combined with the job of interest are written in a predetermined memory area or the like (step S2005). Note that at least one of setup item values, which cannot be changed after a job is generated (e.g., the designated resolution, the number of bits per pixel, graphic mode, or the like), of the job that cannot be combined with the job of interest is different from that of the job of interest.

Figure 26:
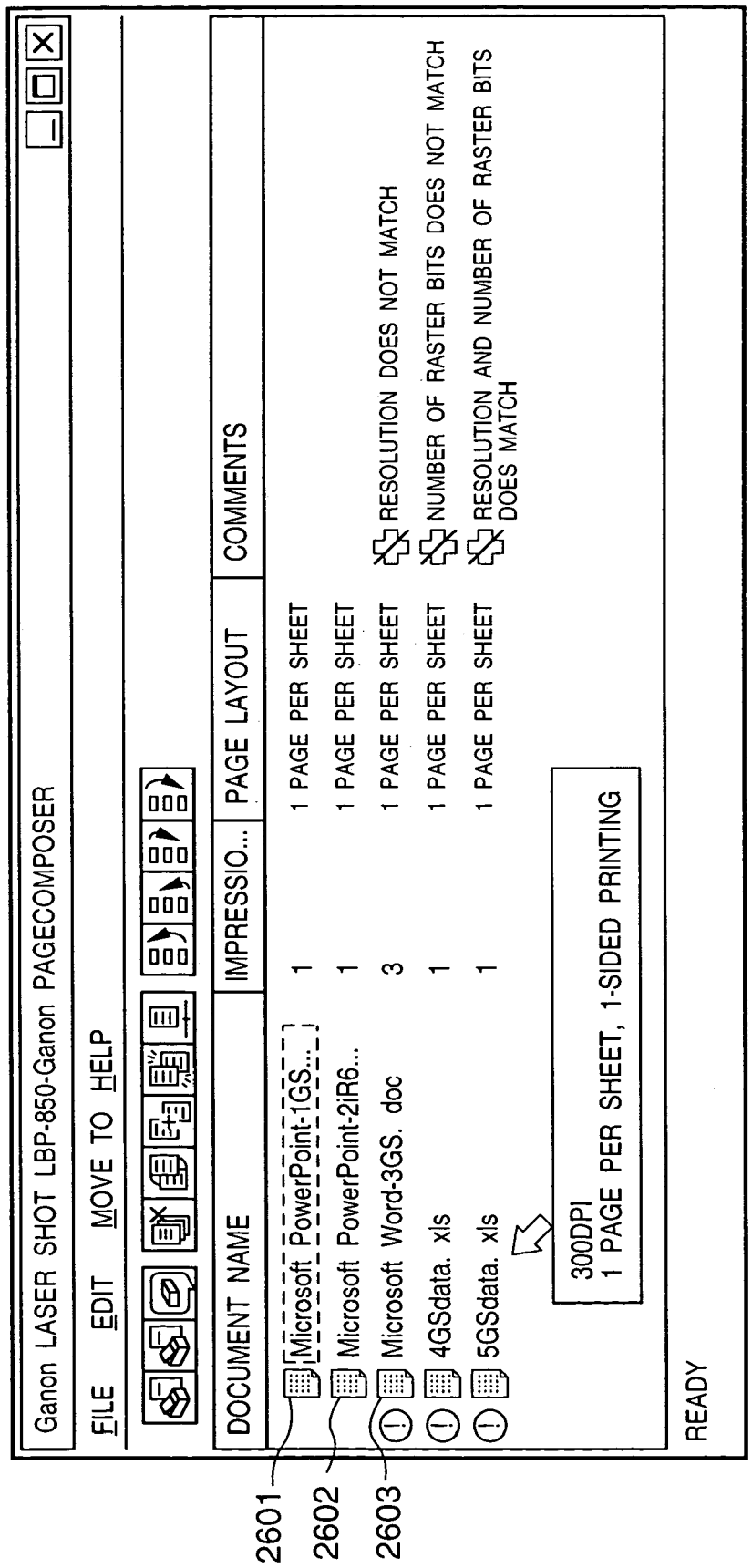
FIG. 26 shows a display example of a job list.

Finally, the job list is displayed in step S2006. In this case, as for the job for which the effect and reason why it cannot be combined with the job of interest are set in step S2005, a symbol indicating that this job cannot be combined with the job of interest and a reason therefor are displayed in the column where that job is displayed. FIG. 26 shows this state. Since a job 2602 can be combined with a selected job 2601, but a job 2603 and subsequent jobs cannot be combined, symbols indicating that message are displayed on the left side of document names, and reasons why these jobs cannot be combined are displayed in a comment field.

On the other hand, if a plurality of jobs are selected, it is checked in step S2007 if the selected jobs can be combined. If YES in step S2007, a combine button (a button 1606 in FIG. 16) is enabled (selectable) in step S2008, and the flow advances to step S2006 to display the job list.

If all the selected jobs cannot be combined, a message indicating that all the held jobs cannot be combined is set in step S2009. In step S2006, symbols and comments are displayed for the jobs for which the message indicating that they cannot be combined is set in step S2009.

In this way, the job list is displayed. As described above, since the sequence in FIG. 20 is executed every time a job is selected from the job list, jobs that can be combined with the selected job, and possibility of the edit or combine operation for the selected job can be presented to the user.

<Edit/Combine Operation>

Figure 21:
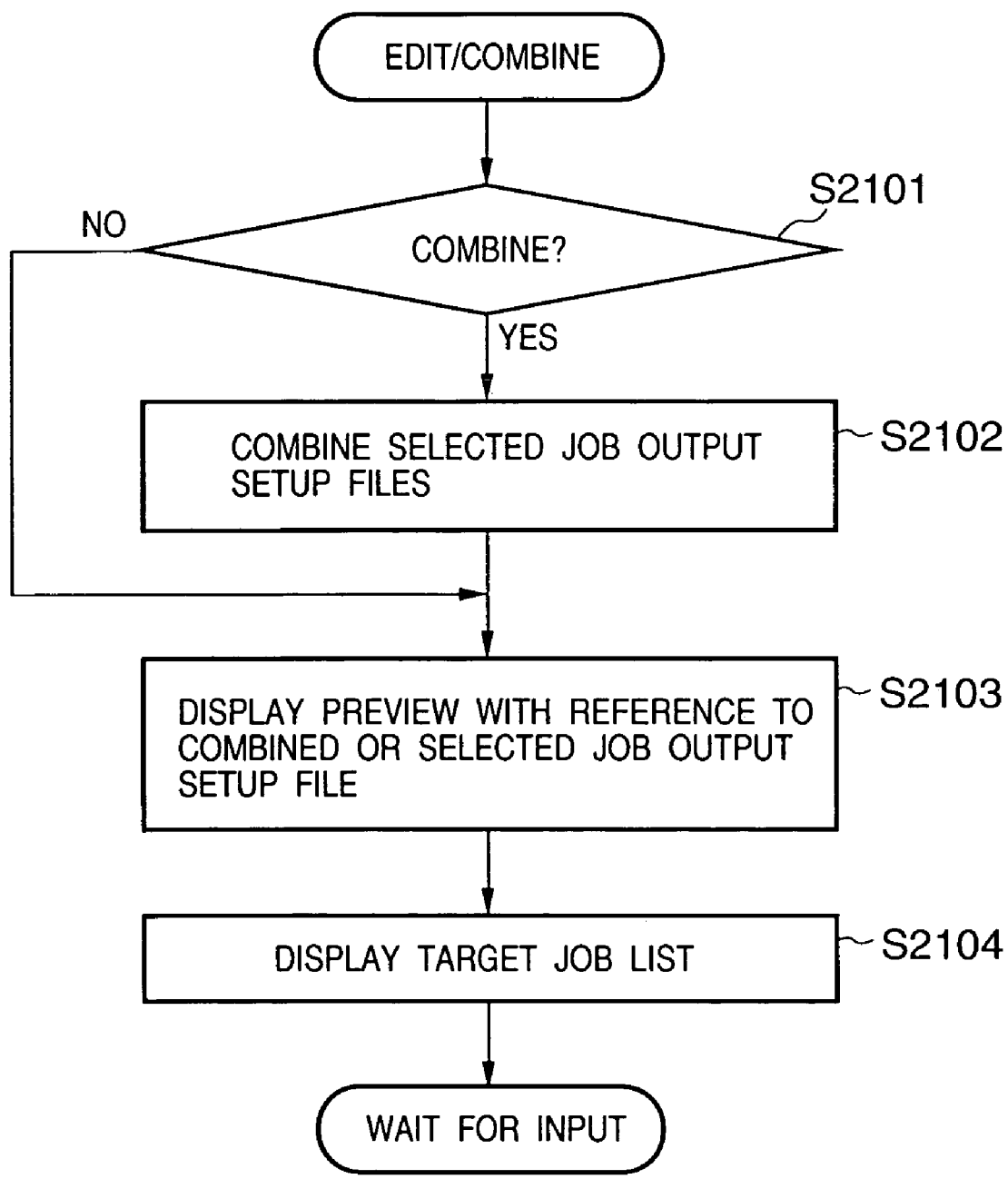
FIG. 21 is a flow chart showing the processing sequence upon operation of an edit button or combine button while a job is selected from a job list.

When the edit button (for a case wherein only one job is selected) or the combine button (for a case wherein a plurality of jobs are selected) is pressed while a job or jobs are selected from the display job list, the sequence shown in FIG. 21 is executed. When jobs which cannot be combined are selected, no combine operation is available.

It is checked in step S2101 if the combine operation is made. If YES in step S2101, selected job output setup files are tentatively combined in step S2102. Since this operation is not settled, a tentative job output file is generated and used. Upon combining jobs, some setup values are changed to common values in place of the individual setups of the jobs.

As the method of setting common setups, the setup values may be changed to predetermined ones, or the setups of jobs other than the first job are set or cleared in correspondence with those of the first job. For example, the print methods of jobs to be combined are commonly set to be one-sided print unless they are all designated with two-sided print. Also, the setup values of the binding margin, staple designation, ascending/descending print order, face-up/down print, use of an inserter, and the like are set in correspondence with those of the first job. In addition, the setup values of the number of copies, bookbinding designation, and the like are cleared.

Preview display is executed using the job output setup file combined in step S2102 or that of a job selected as a job to be edited in step S2103, and a target job list is displayed in step S2104. The preview window displays thumbnail images of all pages contained in jobs to be edited or combined in accordance with their layouts. On the other hand, the target job list displays the names, number of pages, and page layouts of jobs to be edited or combined. In this list display, in case of the combine operation, the job order can be sorted desirably, and a desired job can be deleted from the target jobs. When the target job is operated in this manner, the sequence shown in FIG. 21 is executed again, and the preview window and target job list are re-displayed.

Also, the print setups of the target job can be changed. Items that can be changed are those which can be changed by editing the job output setup file. Items that require operations of intermediate data are inhibited from being operated in this embodiment. However, all items may be re-set regardless of the processing time or resources required. Items that can be re-set in the system of this embodiment are the print method (one-sided/two-sided/bookbinding), the number of copies, the presence/absence of staple, and the like.

<Print Preview Display of Target Job>

Figure 22:
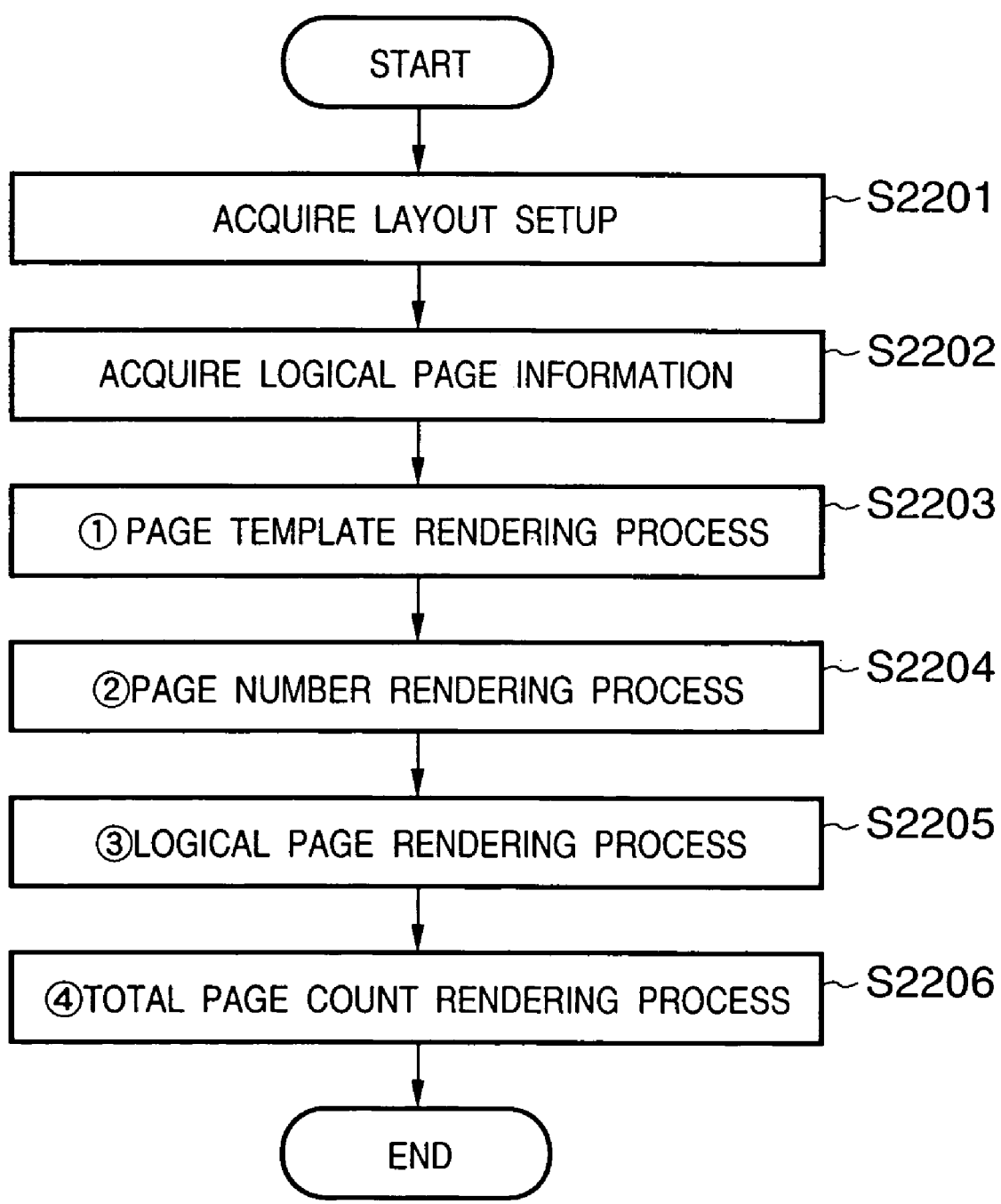
FIG. 22 is a flow chart showing the sequence for displaying a preview window upon operation of an edit button or combine button while a job is selected from a job list.

FIG. 22 is a flow chart showing the sequence for displaying the job preview window shown in FIG. 18 when the user instructs desired operation such as job edit, combine, or the like on the list display window of print jobs shown in FIG. 16, and shows details of step S2103 in FIG. 21.

Referring to FIG. 22, the layout setups of target jobs are acquired in step S2201. The layout setup items include the print method, page layout, page frame, finishing, paper feed switching, and the like, and these pieces of information are acquired from the job output setup file shown in FIGS. 10 to 13.

The layout setup items will be briefly explained below. Examples of items to be set are as follows.

(1) Print method: One of one-sided/two-sided/bookbinding is designated. The one- and two-sided print processes are well known. The bookbinding print process is a method of printing data to obtain the format of a book by only folding printed sheets once and binding them. When the bookbinding print mode is designated, one of a method of folding a set of copies once, and a method of designating a predetermined number of sheets, folding each predetermined number of sheets once, and then stacking and binding them can be designated. Such twofold unit is called a bookbinding unit.

In the bookbinding print process, since a stack of a designated number of sheets, e.g., two output sheets are bound by being folded once, data cannot be printed in the order of logical pages created by the application. The output order of logical pages, i.e., the layout order of logical pages on physical pages, is determined in advance so that logical pages are allocated in turn by turning pages of the bound sheets from the right to left (this direction is designated separately). Also, the order of logical pages differs depending on whether sheets are exhausted facing up or down.

Since the bookbinding print process corresponds to a two-sided 2-up print process in consideration of only the format regardless of the order of pages, four logical pages are printed on the obverse and reverse surfaces of a single sheet. Hence, the required number S of sheets is given by S=the number of logical pages/4 (with raising decimals to the next whole number). For example, when the exhaust method is face-up, and the bookbinding unit is S sheets, the $(4\times(P-1)+2\times Q-1)$-th logical page and $(4\times(P-1)+4\times S-2\times(Q-1))$-th logical page are laid out on the obverse surface (the surface printed first) of the Q-th sheet of the P-th bookbinding unit, and the $(4\times(P-1)+2\times Q)$-th logical page and $(4\times(P-1)+4\times S-2\times Q-1)$-th logical pages are laid out on the reverse surface thereof. In case of the face-down exhaust method, the reverse surface can replace the obverse surface.

(2) Book Opening Direction: This item indicates a direction to turn pages, and one of top open, right open, and left open can be designated.

(3) Bookbinding Unit: As described above, this item indicates a twofold unit in the bookbinding print process.

(4) Page Layout: One of a layout, so-called N-up print, that lays out N logical pages on one surface of a sheet (one physical page), and a layout, so-called poster print, that prints one logical page while dividing it onto a plurality of sheets can be designated.

(5) Finishing: This item can designate a process after the print process. For example, an external apparatus called an inserter can insert a sheet supplied independently of printed sheets as a cover page.

(6) Paper Source Switching: This item designates the way sheets are fed. For example, when middle insert is designated, sheets fed from one of feed ports undergo a print process, and sheets fed from the other feed port are inserted and exhausted between neighboring printed sheets. That is, sheets are alternately fed from the two feed ports.

The items that can be designated as layout setups have been explained.

In step S2202, the logical page information is acquired. The logical page is a page in data created by the application program or the like. When the Nup print process is designated, a plurality of logical pages are printed on one physical page, i.e., on one surface of one sheet. This logical page information is as shown in FIG. 14.

In step S2203, a page template is rendered on the basis of the information acquired in steps S2201 and S2202. The page template is a framework of each physical page in accordance with the designated layout, and is rendered in correspondence with the designated paper size and layout setups such as designation of one-sided/two-sided/bookbinding, portrait/landscape, and the like. However, when the poster print process is designated, since the combined state of images is displayed as a preview image, the above process is not applied.

In step S2204, a page number given to each page to be displayed as a preview image is rendered. In this case, pages are given in the order of logical or physical pages in accordance with the layout. In this way, the user can confirm accurate page numbers corresponding to the layout on the print preview window.

In step S2205, logical pages are rendered in correspondence with each page template. In this case, the job output setup file shown in FIGS. 10 to 14 is looked up, and logical pages are rendered on a single physical page in accordance with the setups registered in the job output setup file.

Intermediate data of the logical pages to be rendered are acquired with reference to the logical page information shown in FIG. 14.

Finally, in step S2206, the total number of pages or the required number of sheets is rendered. The total number of pages amounts to the number of logical pages, and the required number of sheets is the number of paper sheets to be output.

(Page Template Rendering)

Figure 23:
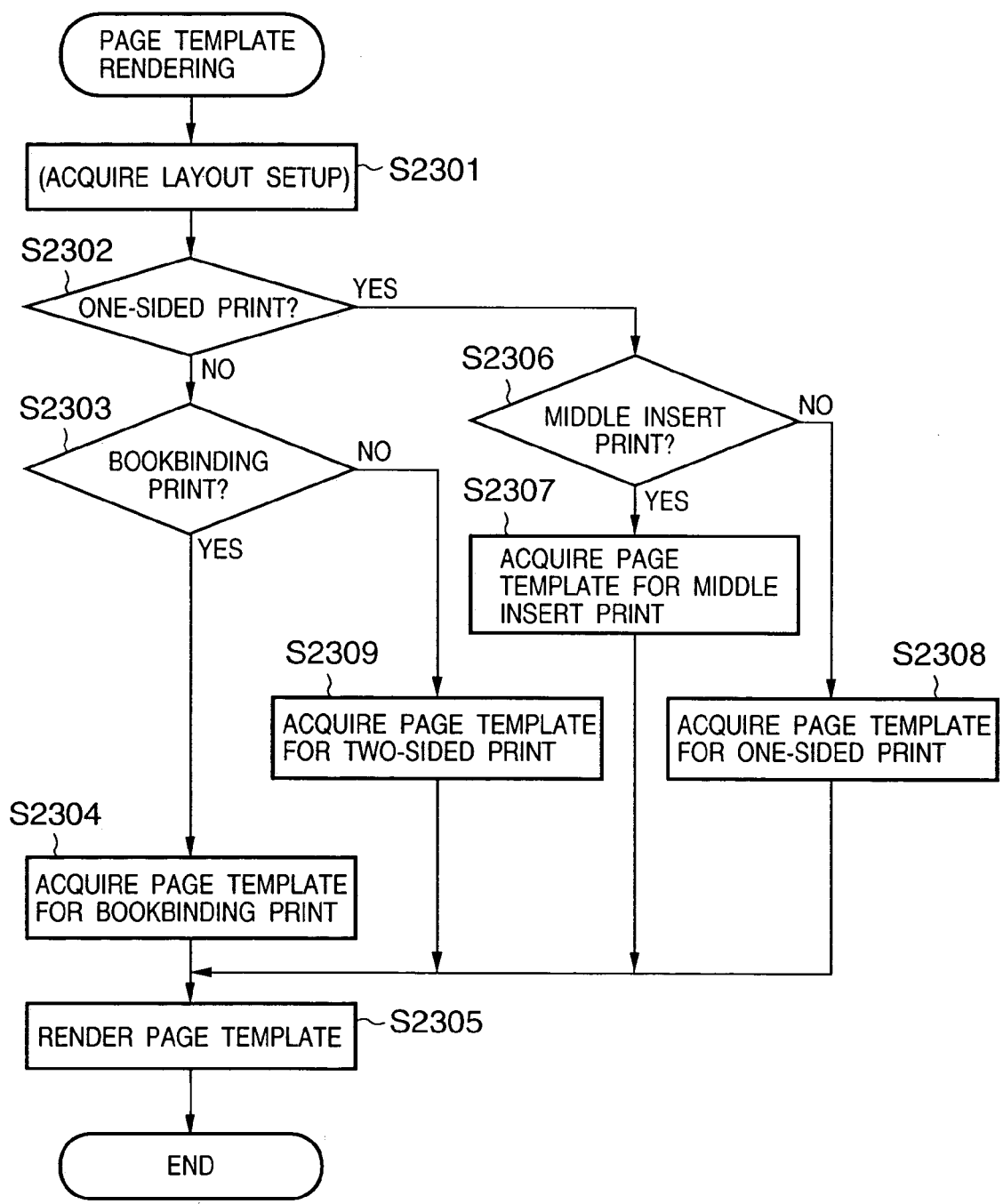
FIG. 23 is a flow chart showing details of step S2203 in FIG. 22.

FIG. 23 is a flow chart showing details of step S2203 in FIG. 22. The layout setups are acquired in step S2301 (enclosed in parentheses since the layout has already been acquired in step S2201 in FIG. 22), and the print method is checked in steps S2302 and S2303. If the bookbinding print process is selected, a page template for bookbinding print is acquired in step S2304; if the two-sided print process is selected, a page template for two-sided print is acquired in step S2309.

If the one-sided print process is selected, it is checked in step S2306 if the middle insert print process is selected. The middle insert print process is a print method for inserting and exhausting independently fed paper sheets between neighboring output printed sheets, and is used when transparent documents for an overhead projector are printed. If the middle insert print process is selected, a page template for middle insert print is acquired in step S2207; otherwise, a page template for one-sided print is acquired in step S2308.

Lastly, in step S2305 the page template is rendered in accordance with the acquired page template data.

(Page Number Rendering)

Figure 24:
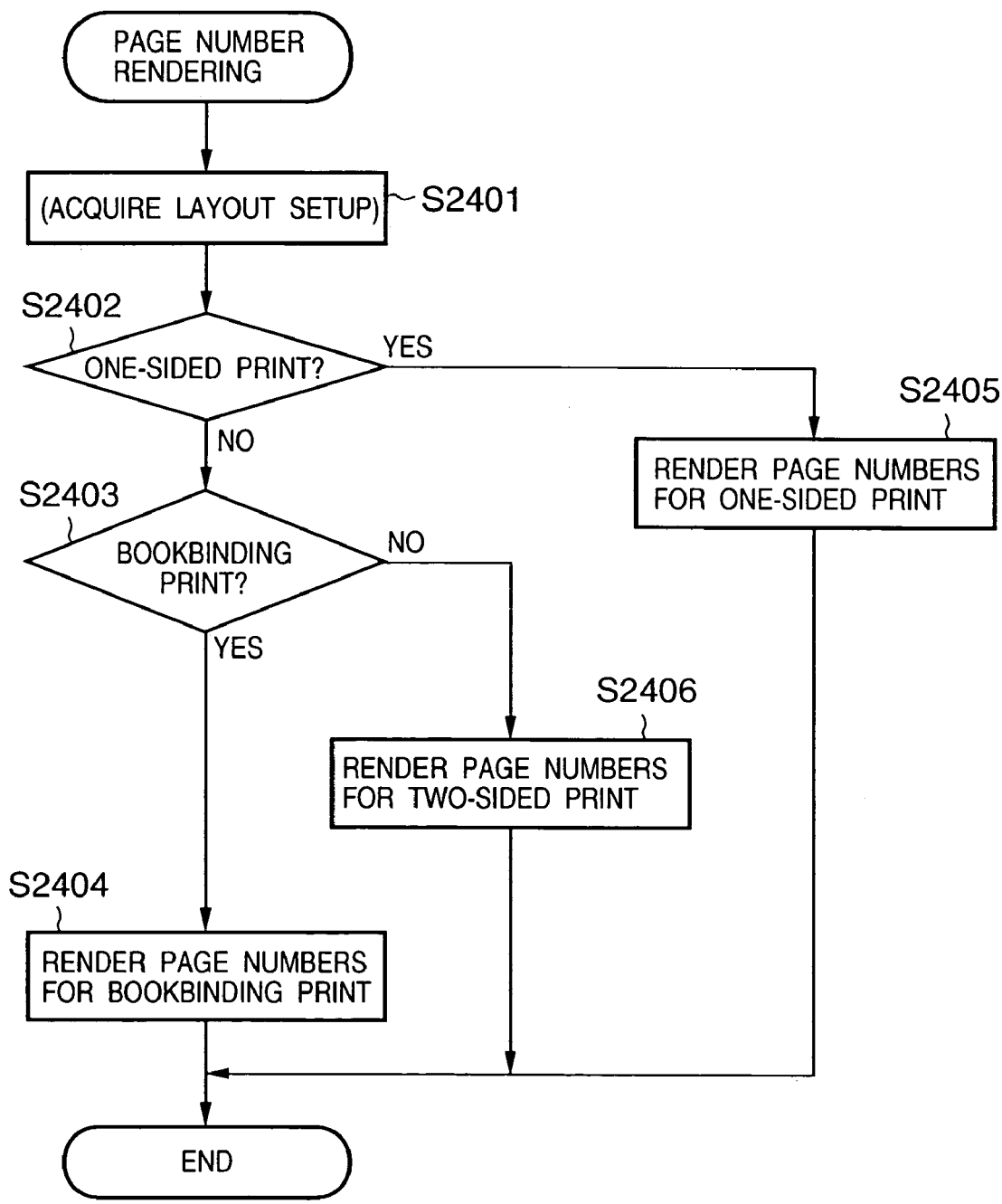
FIG. 24 is a flow chart showing details of step S2204 in FIG. 22.

FIG. 24 is a flow chart showing details of step S2204 in FIG. 22. The layout setups are acquired in step S2401 (enclosed in parentheses since the layout has already been acquired in step S2201 in FIG. 22), and the print method is checked in steps S2402 and S2403. If the bookbinding print process is selected, page numbers for bookbinding print are rendered in step S2404; if the two-sided print process is selected, page numbers for two-sided print are printed in step S2406. On the other hand, if the one-sided print process is selected, page numbers for one-sided print are rendered in step S2405.

(Logical Page Rendering)

Figure 25:
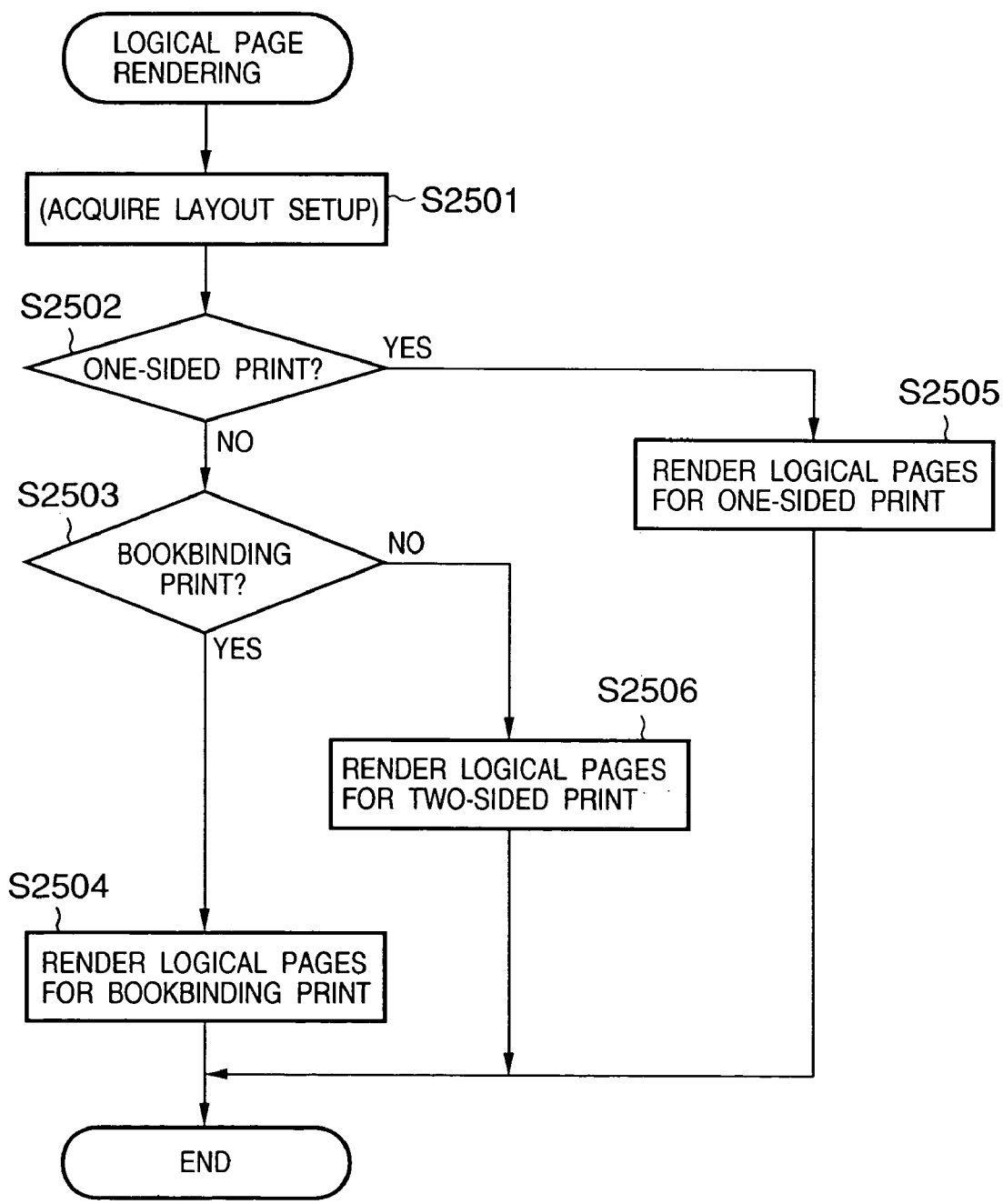
FIG. 25 is a flow chart showing details of step S2205 in FIG. 22.

FIG. 25 is a flow chart showing details of step S2205 in FIG. 22. The layout setups are acquired in step S2501 (enclosed in parentheses since the layout has already been acquired in step S2201 in FIG. 22), and the print method is checked in steps S2502 and S2503. If the bookbinding print process is selected, logical pages for bookbinding print are rendered in step S2504; if the two-sided print process is selected, logical pages for two-sided print are printed in step S2506. On the other hand, if the one-sided print process is selected, logical pages for one-sided print are rendered in step S2505. Since logical pages are rendered in accordance with the job output setup file and logical page information, a process that does not classify according to the print method may be done.

<Details of Logical Page Rendering>

Upon combining a plurality of jobs, the user can designate how to combine these jobs. FIG. 28 shows an example of that designation window. In FIG. 28, the user can designate using a check box 2801 whether to select a new paper sheet at the end of a given job. If this check box is not checked, pages included in two different jobs are never laid out on a single sheet even if these jobs are combined. Upon printing a job which follows a given job, a new sheet is selected at the end of the given job. This is called "new sheet" designation.

If the check box is checked, an input box 2802 is enabled. The input box 2802 displays a pull-down menu that includes methods indicating how to combine the second and subsequent jobs. The user selects a desired method from that menu. This menu includes "Same side on" (FIG. 29) and "Other side on" (FIG. 30) as choices. When "Same side on" is designated, two jobs are continuously rendered. For example, the first page of the second job is laid out immediately after the last page of the first job. When "Other side on" is designated, the first page of the second job is laid out on a surface different from that of the last page of the first job.

In this manner, the way jobs are combined can be changed in accordance with the user's instruction.

Note that the aforementioned function can be used only when a common layout is applied to print jobs to be combined. When a common layout is not used, "new sheet" is designated in this embodiment.

Figure 27:
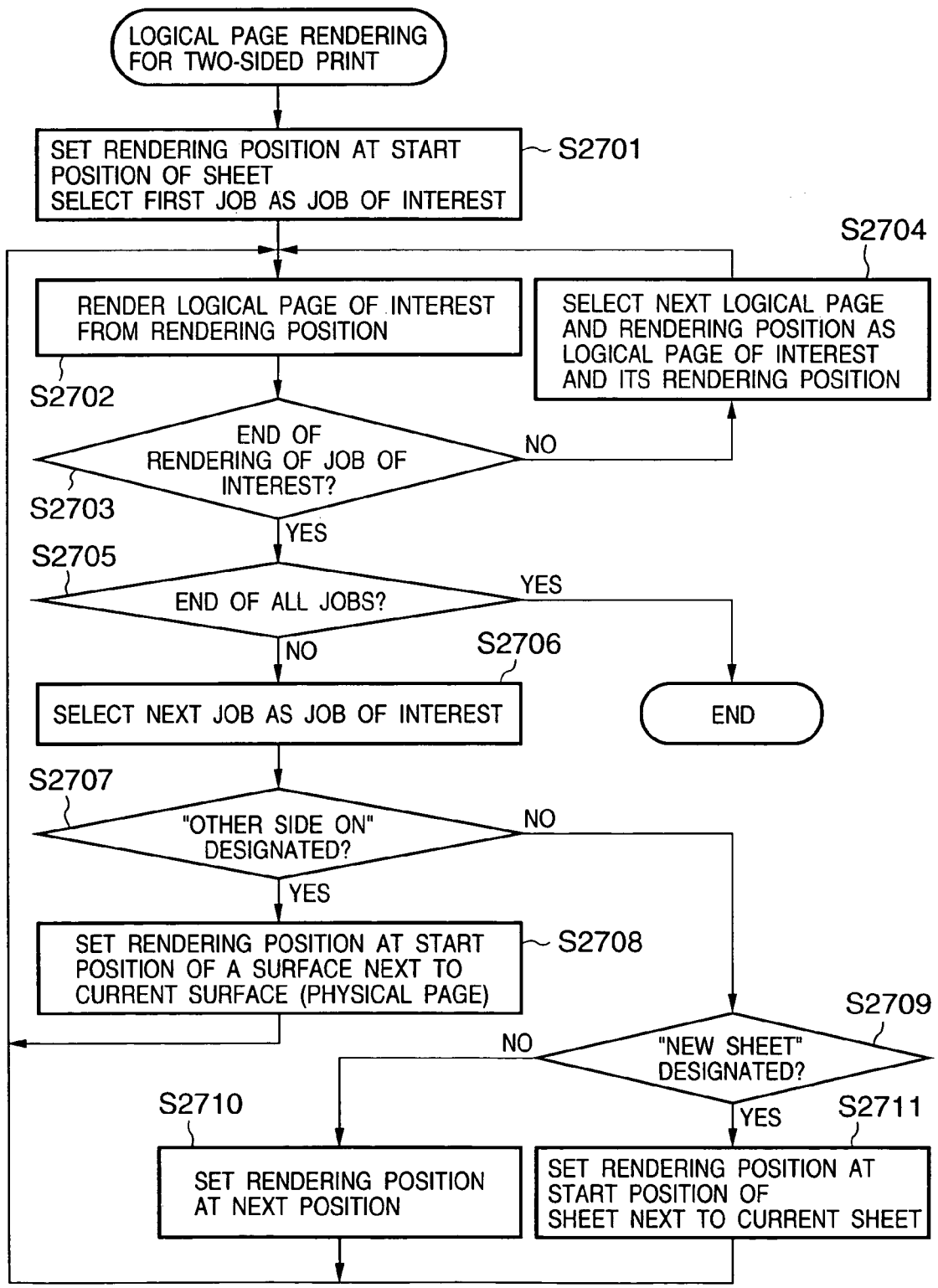
FIG. 27 is a flow chart showing the sequence for rendering logical pages.

FIG. 27 is a flow chart showing details of steps S2505 and S2506 in the logical page rendering sequence in FIG. 25. Although the one- and two-sided print processes have slightly different processing contents, the following explanation will be given under the condition that substantially the same processes are done.

In step S2701, the first rendering position is set at the start position of the obverse surface of a sheet. In this case, a print process is done in the order from the obverse surface to the reverse surface in case of two-sided print. Also, the first job in the target job list is selected as the job of interest which is to be processed.

In step S2702, the page of interest of the job of interest is rendered from the current rendering position. Initially, the first page is rendered on a first-page region on the obverse surface of the sheet.

It is checked in step S2703 if rendering of the job of interest is complete. If NO in step S2703, the next logical page and next rendering position are selected as the logical page of interest and current rendering position. Upon completion of rendering of the job of interest, it is checked in step S2705 if rendering of all target jobs is complete. If YES in step S2705, since rendering of all jobs are complete, a preview image is then displayed in step S2103 in FIG. 21. If jobs to be processed still remain, the next job is selected as the job of interest in step S2706.

It is checked in step S2707 if "Other side on" is designated. If "Other side on" is designated, the rendering position is set at the start position of the surface next to the current surface in step S2708. For example, assume that a two-sided, 2-up print process in which two logical pages are laid out in the order from the left to right is designated, and the last page of the leading job is already laid out on the left side of the obverse surface. In this case, if "Other side on" is designated, the first page of the trailing job is laid out on the left side of the reverse surface of the paper sheet on which the last page of the leading job is laid out. In case of one-sided print, the next surface means the next sheet.

If "Other side on" is not designated, is checked in step S2709 if "new sheet" is designated. If YES in step S2709, the rendering position of the next page is set at the start position of a paper sheet next to the current paper sheet in step S2711.

If neither "Other side on" nor "new sheet" are designated, the rendering position is set at the position next to the current rendering position in step S2710. In this case, the subsequent job simply begins to be rendered from the next position irrespective of the sheet or its surface currently undergoing the print process.

Note that "Other side on" and "new sheet" have different meanings in a two-sided print process, but they have the same meaning in a one-sided print process.

In this manner, the way jobs are combined can be designated upon combining a plurality of jobs. Note that the processes in preview display have been explained, but the same processes are done for surfaces (physical pages) of individual sheets in an actual print process, and a new surface or sheet is selected in accordance with designation. However, in the print process, since the order of surfaces of sheets does not match that of logical pages like in, e.g., bookbinding print, logical pages must often be rendered in an order corresponding to the binding method. This process is different from that in preview display.

<Example of Preview Image>

FIG. 28 shows an example of preview display of a combined job when job 1 including one logical page and job 2 including three logical page are combined, and "top to bottom" layout (for successively laying out logical pages from the top to bottom on one surface of a sheet), "two-sided", "2-up", and "new sheet" are designated. The first page of job 1 is laid out on the start position on the upper left of the obverse surface of the first sheet, and job 2 is laid out from the start position of the second sheet by selecting a new sheet.

FIG. 29 shows an example of preview display of a combined job when job 1 including one logical page and job 2 including three logical page are combined, and "top to bottom" layout, "two-sided", "2-up", and "Other side on" are designated. The first page of job 1 is laid out on the start position on the upper left of the obverse surface of the first sheet, and job 2 is laid out from the start position of the reverse surface of that sheet by selecting a new surface.

FIG. 30 shows an example of preview display of a combined job when job 1 including one logical page and job 2 including three logical page are combined, and "top to bottom" layout, "two-sided", "2-up", and "Same side on" are designated. The first page of job 1 is laid out on the start position on the upper left of the obverse surface of the first sheet, and job 2 is successively laid out from the position next to the first page of job 1.

As described above, when the print job exemplified in FIG. 28 is displayed as a preview image while its layout is changed from "two-sided" to "one-sided" and "new sheet" is designated, the first page of job 1 is laid out on the upper region of the first sheet, and the first page of job 2 is laid out on the upper region of the next sheet. That is, display from which a blank sheet corresponding to the reverse surface of the first sheet in FIG. 28 is omitted is made. Since "Other side on" and "new sheet" have the same meaning in the one-sided print process, the same display is made even when "new sheet" is designated.

To restate, in the print control apparatus of this embodiment, how to combine jobs can be designated, and preview display or an actual print process from the printer can be done in accordance with such designation. In this way, the degree of freedom in print job edit increases, thus improving print convenience.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code that can implement the functions of the above-mentioned embodiments, i.e., the sequences shown in FIGS. 19 to 25 and FIG. 27 to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To recapitulate, according to the present invention, when a plurality of print jobs, the way print jobs are combined can be designated. Also, preview display or an actual print process from the printer can be done according to the designated process. In this way, the degree of freedom in print job edit increases, thus improving print convenience.

As many apparently widely different embodiments of the present invention can be made without departing from the spirit and scope thereof, it is to be understood that the invention is not limited to the specific embodiments thereof except as defined in the appended claims.

What is claimed is:

1. A print control method of combining stored print jobs, comprising:
   a layout instructing step of allowing a user to instruct plural print jobs to use a common layout when the plural print jobs are combined;
   a combine method designating step of allowing a user to designate a combine method from a plurality of combine methods for indicating how to lay out each page of the plural print jobs to be combined on plural sheets when it is instructed in said layout instructing step that the common layout is used by the plural print jobs and double-sided printing is designated; and
   a layout step of successively laying out a last page of a leading print job and a first page of a trailing print job without a gap when a first method is designated as the combine method, laying out the first page of the trailing print job on a surface next to a surface on which the last page of the leading print job is laid out when a second method is designated as the combine method, and laying out the first page of the trailing print job on a sheet next to a sheet on which the last page of the leading print job is laid out when a third method is designated as the combine method.

2. The method according to claim 1, further comprising a step of displaying an input window used to designate the combine method.

3. The method according to claim 1, wherein when a one-sided print process is designated, the surface next to the surface on which the last page of the leading print job is laid out is a sheet next to a sheet on which the last page of the leading print job is laid out.

4. The method according to claim 1, further comprising a step of making display means display a preview image of the print jobs in a layout corresponding to the designated combine method.

5. The method according to claim 1, further comprising a step of making a marking engine mark in an image in accordance with the print jobs in a layout corresponding to the designated combine method.

6. The method according to claim 1, further comprising a storing step of storing print data in units of print jobs.

7. A print control apparatus for combining stored print jobs, comprising:
   a layout instruction unit, adapted to allow a user to instruct plural print jobs to use a common layout when the plural print jobs are combined;
   a combine method designating unit, adapted to allow a user to designate a combine method from a plurality of combine methods for indicating how to lay out each page of the plural print jobs to be combined on plural sheets when it is instructed in said layout instructing step that the common layout is used by the plural print jobs and double-sided printing is designated; and
   a layout editor, adapted to successively lay out a last page of a leading print job and a first page of a trailing print job without a gap when a first method is designated as the combine method, laying out the first page of the trailing print job on a surface next to a surface on which the last page of the leading print job is laid out when a second method is designated as the combine method, and laying out the first page of the trailing print job on a sheet next to a sheet on which the last page of the leading print job is laid out when a third method is designated as the combine method.

8. The apparatus according to claim 7, further comprising a display that displays an input window used to designate the combine method.

9. The apparatus according to claim 7, wherein when a one-sided print process is designated, the surface next to the surface on which the last page of the leading print job is laid out is a sheet next to a sheet on which the last page of the leading print job is laid out.

10. The apparatus according to claim 7, further comprising a previewer, adapted to make said display unit display a preview image of the print jobs in a layout corresponding to the designated combine method.

11. The apparatus according to claim 7, further comprising a printer driver for making a marking engine mark in an image in accordance with the print jobs in a layout corresponding to the designated combine method.

12. The apparatus according to claim 7, further comprising a storage for storing print data in units of print jobs.

13. A computer readable storage medium that stores a computer program for combining stored print jobs, said program including:
   a layout instructing procedure code for allowing a user to instruct plural print jobs to use a common layout when the plural print jobs are combined;
   a combine method designating procedure code for allowing a user to designate a combine method from at least three combine methods for indicating how to lay out each page of the plural print jobs to be combined on plural sheets when it is instructed in said layout instructing step that the common layout is used by the plural print jobs and double-sided printing is designated; and
   a layout procedure code for successively laying out a last page of a leading print job and a first page of a trailing print job without a gap when a first method is designated as the combine method, laying out the first page of the trailing print job on a surface next to a surface on which the last page of the leading print job is laid out when a second method is designated as the combine method, and laying out the first page of the trailing print job on a sheet next to a sheet on which the last page of the leading print job is laid out when a third method is designated as the combine method.

14. The medium according to claim 13, wherein said computer program further includes a procedure code for displaying an input window used to designate the combine method.

15. The medium according to claim 13, wherein when a one-sided print process is designated, the surface next to the surface on which the last page of the leading print job is laid out is a sheet next to a sheet on which the last page of the leading print job is laid out.

16. The medium according to claim 13, wherein said computer program further includes a procedure code for making display means display a preview image of the print jobs in a layout corresponding to the designated combine method.

17. The medium according to claim 13, wherein said computer program further includes a procedure code for making a marking engine mark in an image in accordance with the print jobs in a layout corresponding to the designated combine method.

18. The medium according to claim 13, wherein said computer program further includes a procedure code for storing print data in units of print jobs.

* * * * *

UNITED STATES PATENT AND TRADEMARK OFFICE
CERTIFICATE OF CORRECTION

PATENT NO. : 6,965,440 B1
APPLICATION NO. : 09/703692
DATED : November 15, 2005
INVENTOR(S) : Nakagiri et al.

It is certified that error appears in the above-identified patent and that said Letters Patent is hereby corrected as shown below:

COLUMN 1:
Line 42, "has" should read -- has as --.

COLUMN 8:
Line 8, "'close))," should read -- "close"), --.

COLUMN 18:
Line 43, "ifs" should read -- is --.

COLUMN 25:
Lines 21, 31 and 40, "page" should read -- pages --.

Signed and Sealed this

Twelfth Day of September, 2006

JON W. DUDAS
*Director of the United States Patent and Trademark Office*